July 6, 1954    J. DAUGHERTY ET AL    2,682,697
MACHINE TOOL
Filed Dec. 5, 1947    9 Sheets-Sheet 1
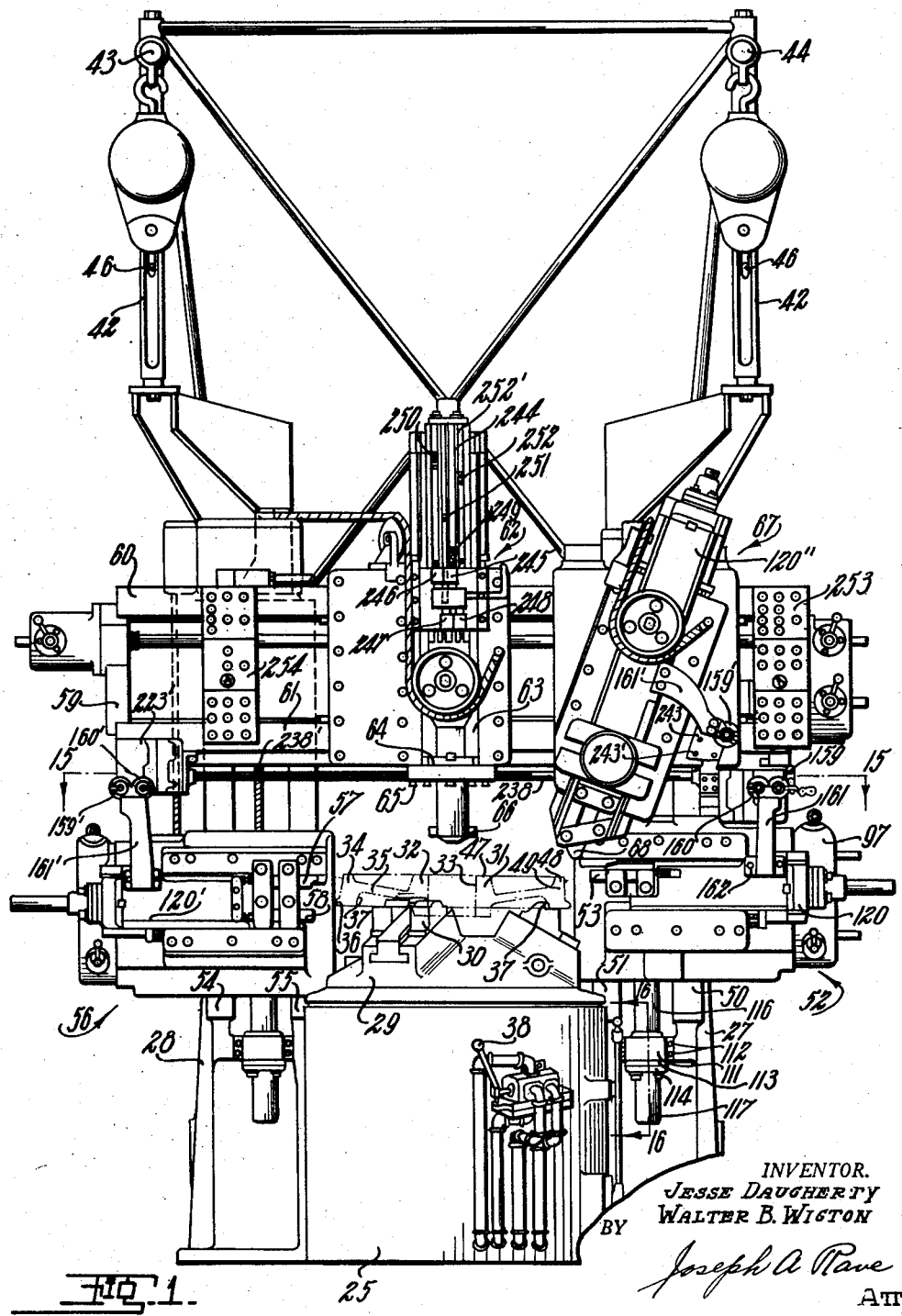
INVENTOR.
JESSE DAUGHERTY
WALTER B. WIGTON
BY
Joseph A. Rave
ATTY.

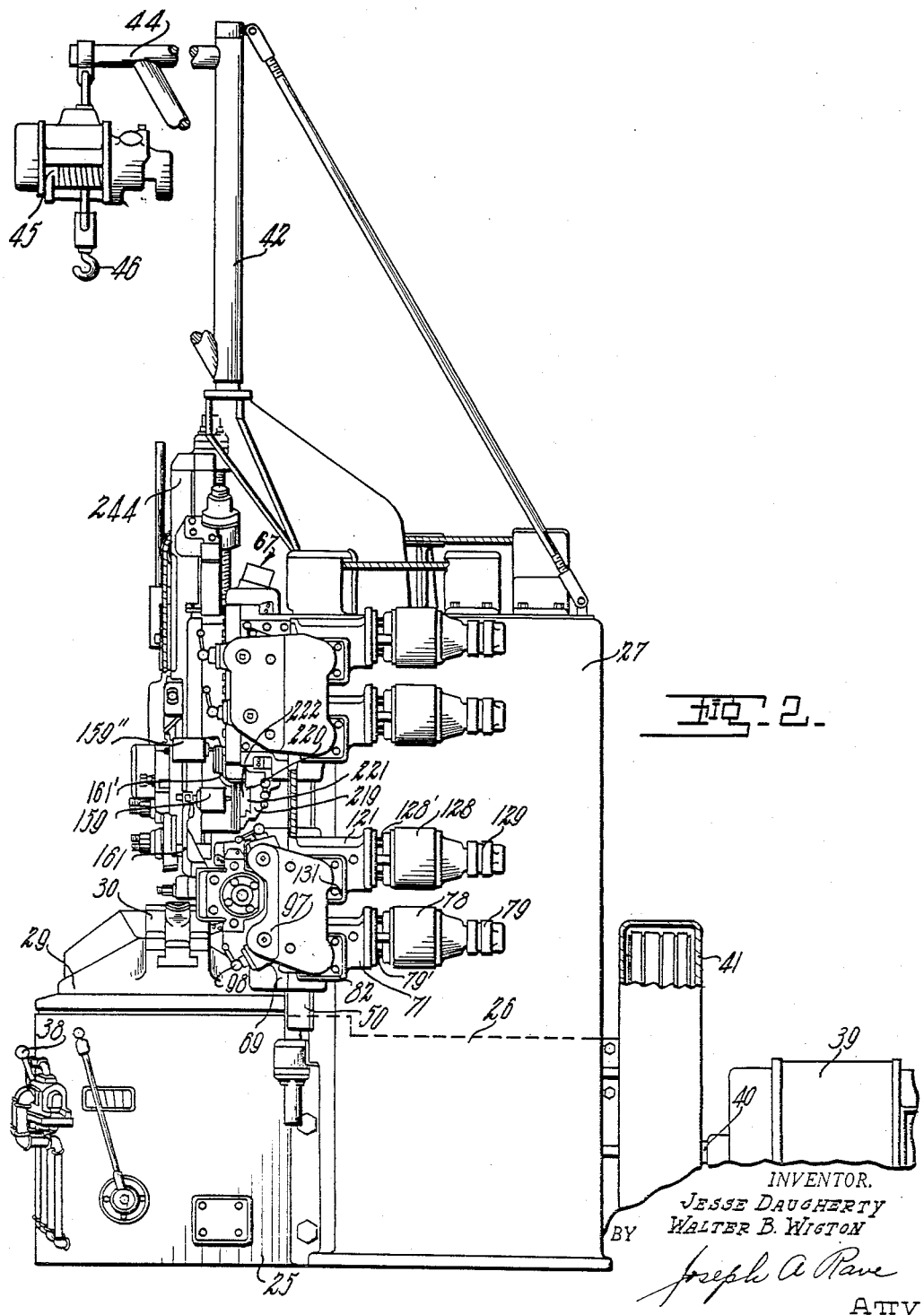

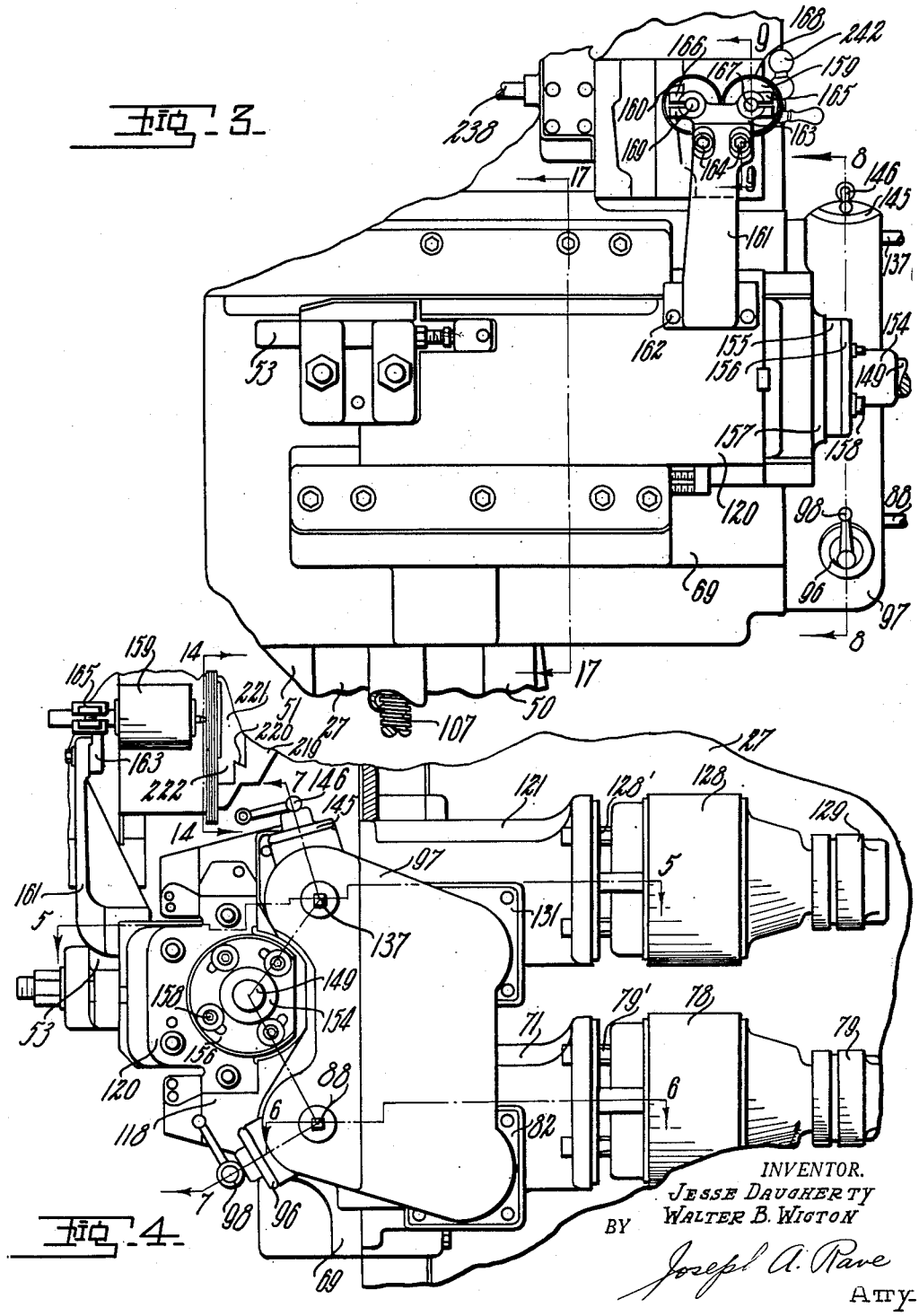

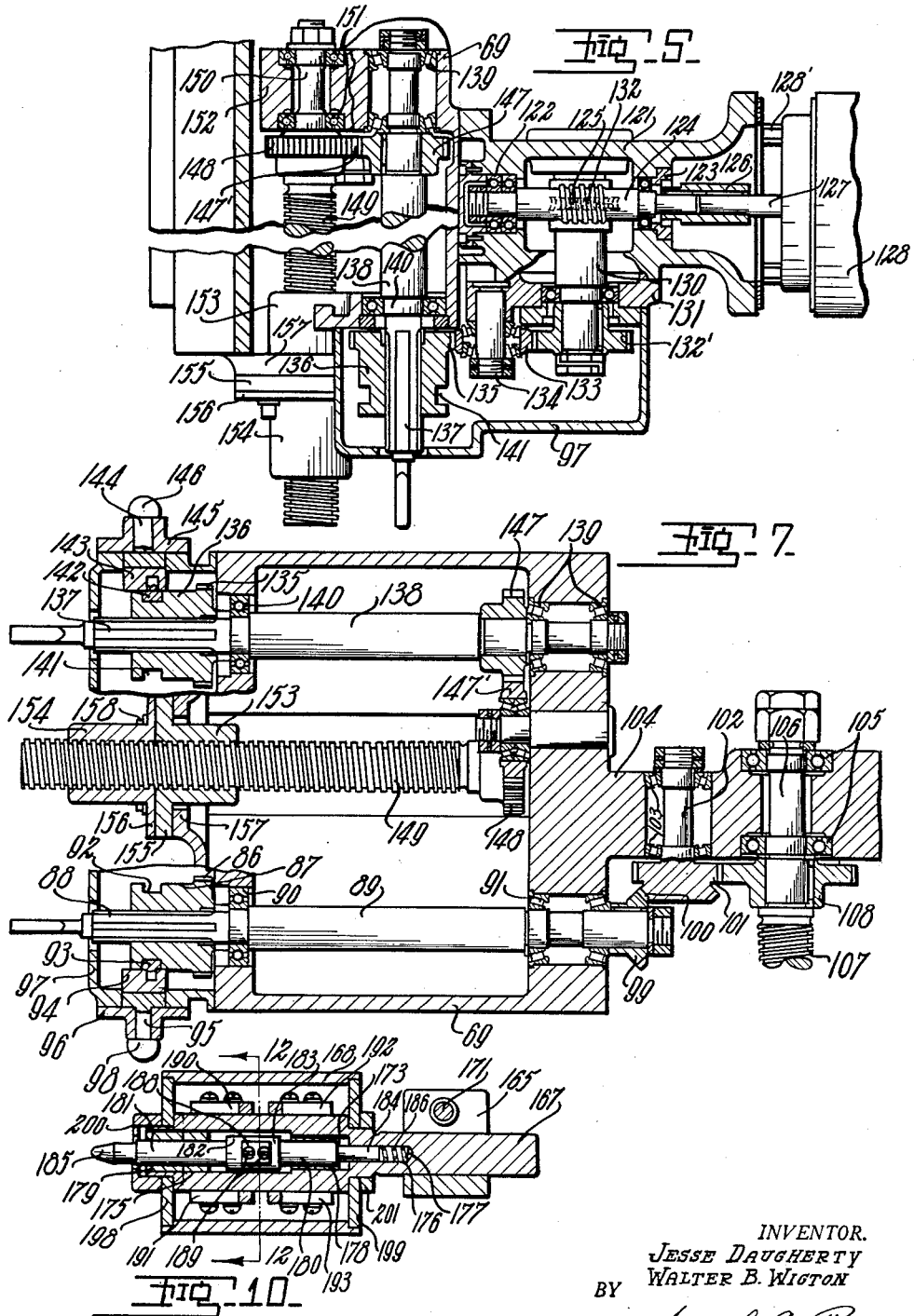

July 6, 1954

J. DAUGHERTY ET AL 2,682,697

MACHINE TOOL

Filed Dec. 5, 1947

INVENTOR.
JESSE DAUGHERTY
WALTER B. WIGTON

BY Joseph A. Rave

ATTY.

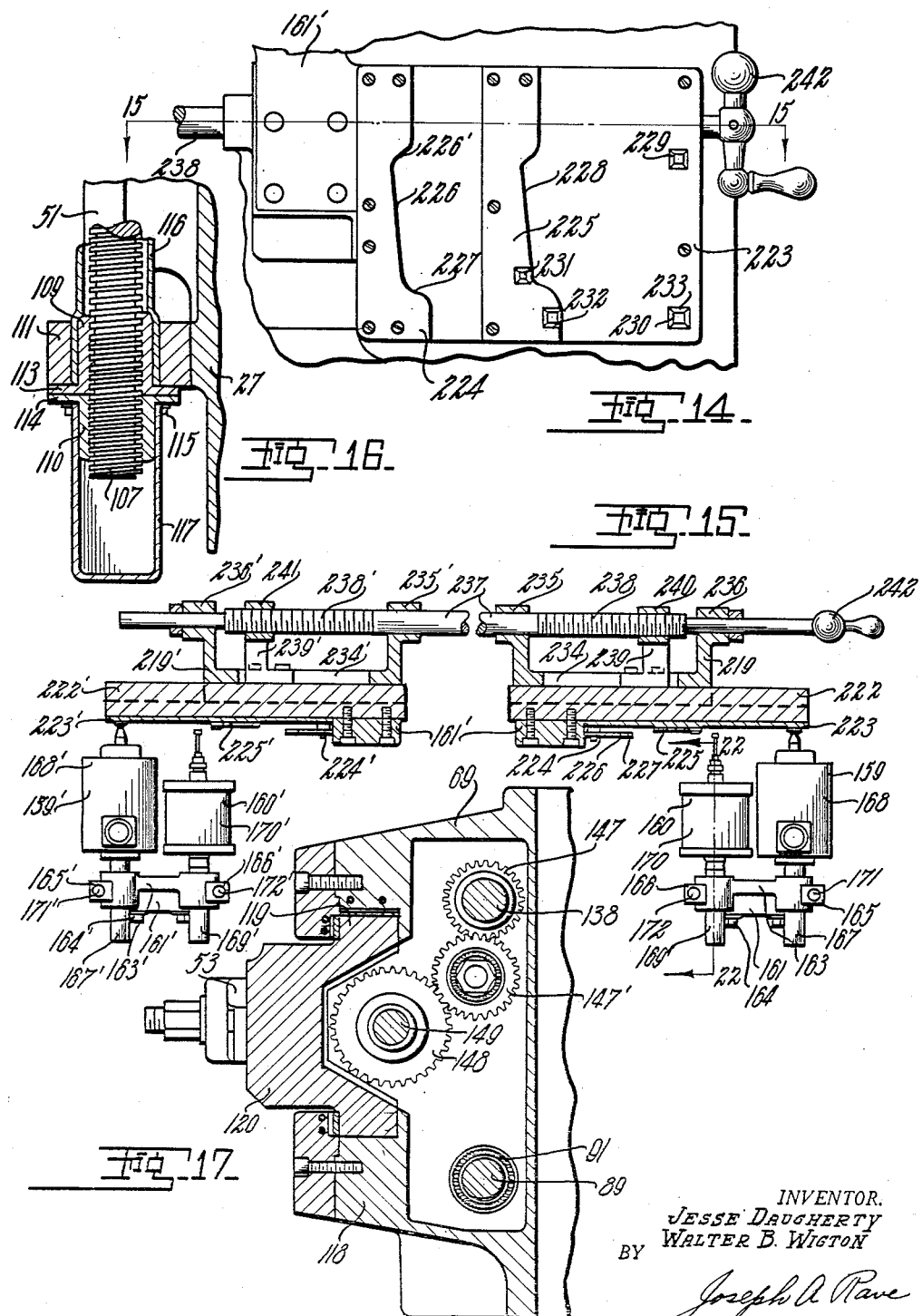

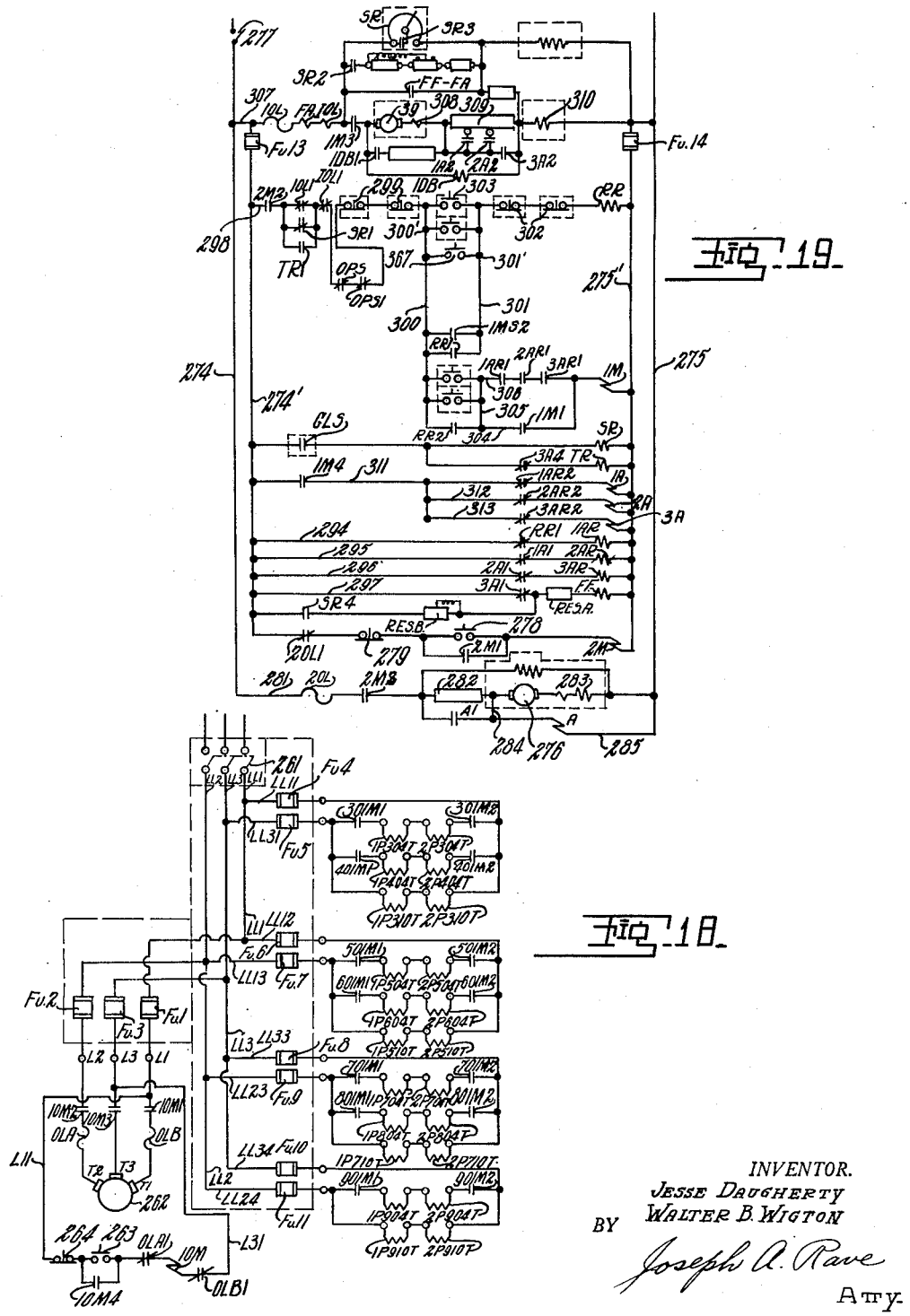

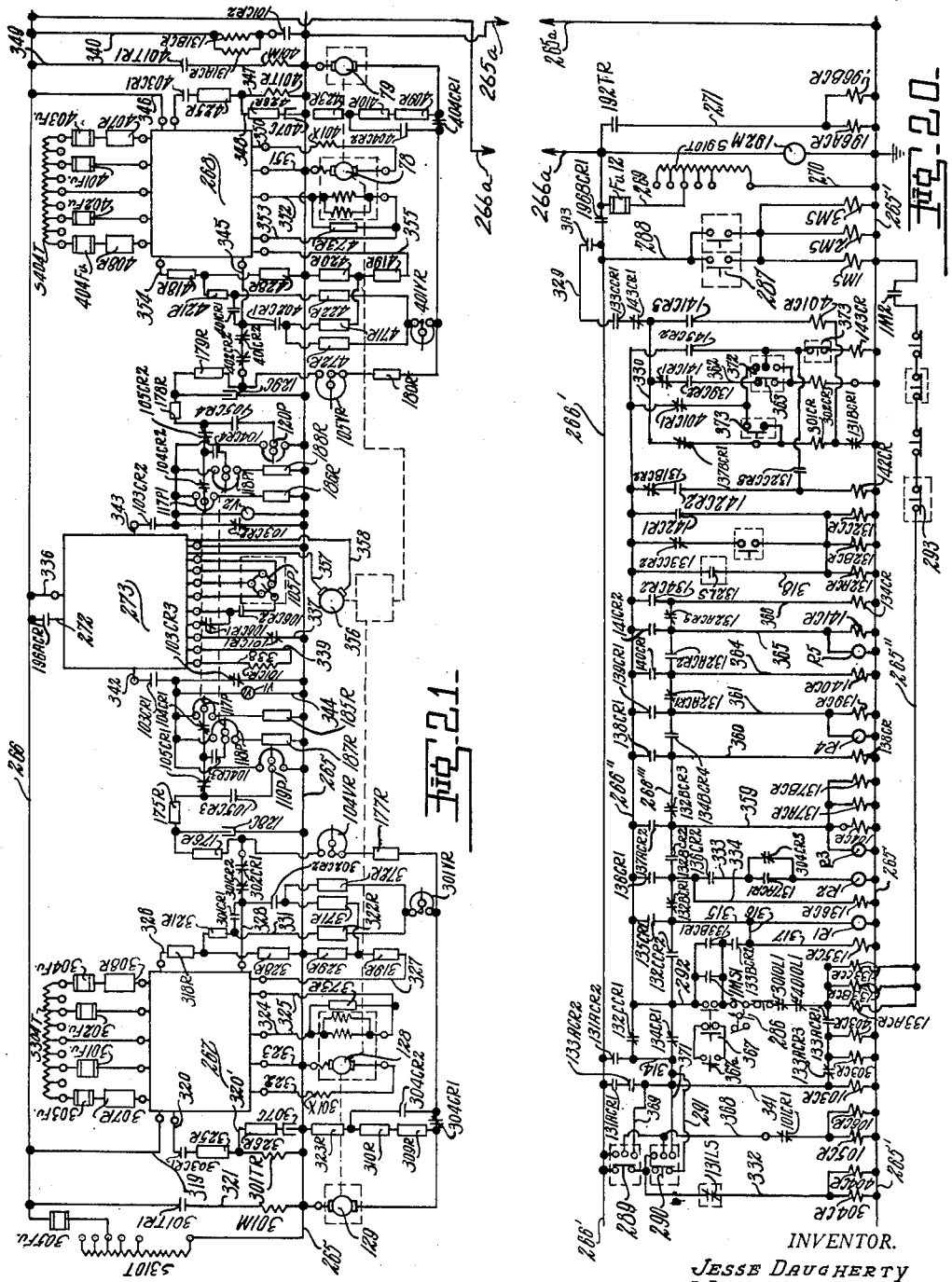

July 6, 1954

J. DAUGHERTY ET AL 2,682,697

MACHINE TOOL

Filed Dec. 5, 1947

INVENTOR.
JESSE DAUGHERTY
BY WALTER B. WIGTON

Joseph A. Rave
ATTY.

Patented July 6, 1954

2,682,697

UNITED STATES PATENT OFFICE 2,682,697

MACHINE TOOL

Jesse Daugherty and Walter Bernard Wigton, Cincinnati, Ohio, assignors, by mesne assignments, to Giddings & Lewis Machine Tool Company, Fond du Lac, Wis., a corporation of Wisconsin Application December 5, 1947, Serial No. 789,998

5 Claims. (Cl. 29—26)

This invention relates to improvements in machine tools and particularly to improvements in means for controlling and effecting a cyclic movement of a tool and work piece such, for example, as in forming work to a contour as established by a templet or gauge.

Machine tools for performing turning operations on work pieces to a predetermined contour as established or determined by a templet or gauge are well known but in the past this contouring was effected at a constant rate of speed and only after the control mechanism and work and tool had been operatively associated with one another. With this type of machine production was limited and the desired finish on the work, at critical points thereon, was likewise limited with the finish not the most desirable. Prior contouring machine tools, as noted above, necessitated substantially a setting up of the machine and work for each successive piece of work even though a large number of duplicate pieces to the same contour was desired and which setting up of the machine required a manual adjustment of the parts. In the event the work and tool, for the operative association of these parts, was effected automatically the normal clearance between the work and tool, necessary to permit replacement of a finished work piece by an unfinished one and frequently of considerable distance, was traversed at quite small rate, at best the maximum cutting speed of the tool and work. Another difficulty, again as intimated above, was the fact that the feeding rate between the tool and work was substantially constant regardless of the particular portion of the work being formed which resulted in certain portions of the work having a finish other than that necessary so that the work piece had to be subjected to a further machining or tooling operation.

The machine of the present invention overcomes each of these difficulties whereby a more accurate control of the work and tool is effected and a completely automatic machine is provided requiring the user or operator to merely press a starting button or close a starting switch or other pilot device whereupon a cycle of operation of the machine is initiated and the machine completes its operation and stops.

It is, therefore, the principal object of the present invention to provide a machine tool for providing duplicate contoured work that is automatic in its operation.

Another object of the present invention is the provision of a machine tool for accomplishing the foregoing object that is adapted to sequentially rapidly adjust the work and tool, feed the work and tool relative to one another at slow feeding rates, and rapidly retract the tool from the work.

Another object of the present invention is the provision in a machine tool of sequentially operating means for positioning the work and tool relative to one another and effecting a feeding of the tool relative to the work each under separate control means which are independent of one another and interlocked so that when one is operating the other is non-operative.

Another object of the present invention is the provision of means for sequentially effecting the movement of a tool and work relative to one another through angularly related paths and in which said movement through certain paths is at a rapid rate while in other paths is at a slow rate and in which slow rate paths the rate of movement may be adjusted.

The machine tool illustrated in the drawings and to be subsequently described in detail is for completely finishing at one setting a car wheel, that is a wheel of forge steel as employed on rolling stock, such as railroad cars, locomotives, electric street cars, and the like employed on rails, and in which wheels the shape of the tire and flange are important to the proper operation thereof.

It is, therefore, a further and specific object of the present invention to provide an improved machine, a car wheel mill, for producing so called car wheels.

A still further and specific object of the present invention is the provision of a machine tool for producing turned work pieces in which the periphery of the work piece is turned to a predetermined or preestablished contour and in which the said work and tool are accurately controlled.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a front elevation of a machine tool, a car wheel mill, embodying the principles of the present invention.

Fig. 2 is a side elevation of the machine of

Fig. 1 as seen particularly from the right-hand side thereof.

Fig. 3 is an enlarged elevational view of one of the heads of the machine, specifically, the right-hand side head.

Fig. 4 is an end elevation of the head of Fig. 3 as seen particularly from the right-hand side of said Fig. 3.

Fig. 5 is a fragmentary sectional view through the head of Fig. 4 taken on line 5—5 of said Fig. 4.

Fig. 6 is a view similar to Fig. 5 taken in a plane below that of Fig. 5 on line 6—6 on Fig. 4.

Fig. 7 is a fragmentary vertical sectional view through the head taken at right angles to Figs. 5 and 6 on line 7—7 on Fig. 4.

Fig. 8 is a sectional view taken through a plane just below the plane of the guard of Fig. 4 on line 8—8 on Figs. 3 and 6.

Fig. 9 is an enlarged sectional view through a control mechanism as seen from line 9—9 on Fig. 3.

Fig. 10 is a sectional view taken at right angles to Fig. 9 on line 10—10 on said Fig. 9.

Fig. 11 is a transverse sectional view through the said control mechanism taken on line 11—11 on Fig. 9.

Fig. 12 is a transverse sectional view through the control mechanism taken through a plane ahead of that of Fig. 11 on line 12—12 on Fig. 10.

Figure 13:
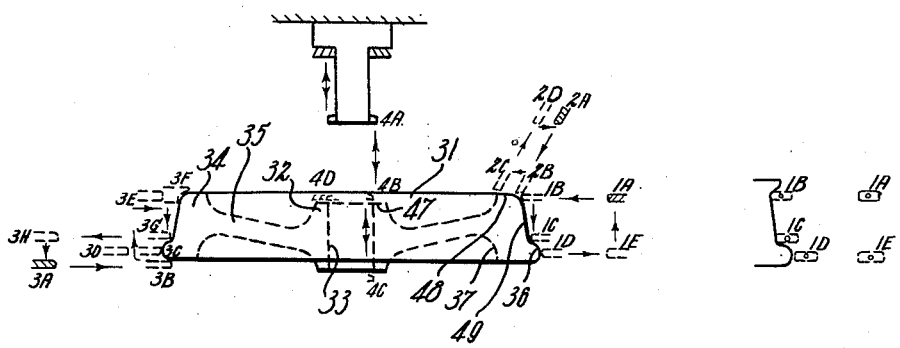

Fig. 13 is a diagrammatic view showing the paths of movement of the several work heads with respect to the work piece, specifically, a car wheel.

Fig. 14 is an enlarged plan view of the mechanism for effecting automatic cycle of the machine.

Fig. 15 is an enlarged transverse fragmentary sectional view through the control mechanism of Fig. 14 as seen from line 15—15 on Fig. 1.

Fig. 16 is an enlarged fragmentary vertical sectional view through the tool head elevating mechanism as seen from line 16—16 on Fig. 1.

Fig. 17 is a transverse sectional view through one of the tool heads ram and saddle as seen from line 17—17 on Fig. 3.

Fig. 18 is a wiring diagram showing the connection of the several tool head control mechanisms with the source of current.

Fig. 19 is a wiring diagram of the electric circuits to the main motor and illustrating the interlock with the motors of the several tool heads.

Fig. 20 is an electrical wiring diagram for the control mechanism circuit for the motors of one of the tool heads.

Fig. 21 is an electrical wiring diagram showing the circuits to the motors of one of the heads that effects the rate and direction of rotation of said motors.

Figure 22:
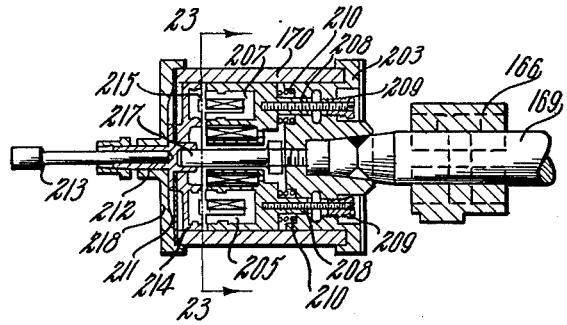

Fig. 22 is a longitudinal sectional view of a controlling mechanism as seen from line 22—22 on Fig. 15.

Figure 23:
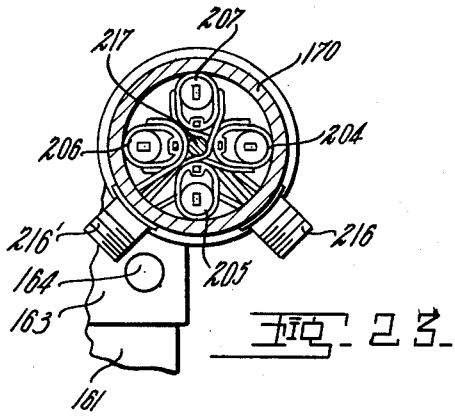

Fig. 23 is a transverse sectional view of the device taken on line 23—23 on said Fig. 22.

Throughout the several views of the drawings similar reference characters are employed to denote the same or similar parts.

As was noted above, the machine illustrated in the drawings and presently to be described in detail is for turning and boring car wheels.

This machine is basically a boring mill well known in the trade and utilized for turning, facing and boring work pieces in which the work is rotating while tools are actuated relative thereto in effecting the said operations. It is to be understood however that the control mechanism may be employed with equal facility in machine tools where the work is held stationary and the tools rotated relative thereto as well as in machine tools where no rotation is given either the work or tool such, for example, as a planer, and wherein the work is actuated, though not rotated, relative to the tool and the tool or tools are rotated during the work movement as in a planer milling machine.

Specifically, and referring to the drawings the machine tool comprises a supporting bed 25 having a portion 26 rearwardly projecting and laterally of which projecting portion are uprights 27 and 28 referred to in the trade as side housings. The bed 25 has mounted thereon at its upper end a work supporting chuck 29 having associated therewith movable jaws 30 adapted to engage the work piece 31. The work piece 31 is illustrated in the drawings as a car wheel having a central hub 32 through which is provided an axle receiving bore 33. The car wheel 31 has a rim or tire portion 34 connected to the hub 32 by a radial flange or web 35. At the rear side of the wheel 31, or at the inner circumference of the tire 34, there is provided an outwardly projecting flange 36. The rim 34 of the wheel has the web 35 inwardly of its rear edge, as at 37, and it is this portion of the rim that is engaged by the chuck jaws 30 for mounting the wheel in operative position. The said chuck or work holding means forms no part of the present invention except in combination with the tools, said chuck or work holding means forming the subject matter of pending application of Edward W. Kroeger and Jesse Daugherty, Serial No. 732,172, filed March 4, 1947, and entitled "Work Holding Means," now Patent No. 2,585,944, issued February 19, 1952.

The chuck jaws 30 are actuated to their clamping and unclamping positions by hydraulically actuated means which is under the control of a manually actuable lever 38 for actuating suitable valves which is clearly disclosed in the above identified Kroeger and Daugherty application.

The table 29 is rotated through suitable gearing connected therewith and driven by a motor 39 having a shaft 40 that enters a housing 41 for driving a motion transmitting train, illustrated in the above identified Kroeger and Daugherty application as a multiple V belt, driving through a power train in the housing extension 26 for effecting the rotation of the table 29 and work 31 securely clamped thereto.

It might be pointed out, due to the weight of the particular work piece illustrated in the drawings, suitable crane mechanisms are provided for loading and unloading the work on the table 29 which comprises a frame 42 having projecting from the upper corners thereof arms 43 and 44 each of which has a power actuated cable winding and unwinding drum 45 with a hook 46 at the end of each cable.

By this arrangement one of said cranes or power actuated drums 45 may pick up and have in readiness a rough work piece while the piece presently in the machine is being tooled. At the conclusion of the tooling operation the second crane or power driven drum 45 may be utilized for removing the said finished work piece from the table and its chuck, and after positioning the unfinished work piece from the first crane or power driven drum, said finished work piece unloaded during the tooling of said second work piece. This is not new, per se, but contributes to the ease of operating the machine and its increased production.

During a complete cycle of operation of the machine, the work piece or car wheel 31 is adapted to have the axle bore 33 formed therethrough, the front face 47 of its hub 32 smoothed or finished, the front face 46 of its rim 34 trued, the angular tread 49 of the rim 34 accurately formed to a predetermined contour or taper, the rear flange 36 accurately formed and rounded and have the front corner of the rim 34, between the face 48 and tread 49, accurately and suitably rounded. In order to accomplish these operations a plurality of tooling heads are employed each of which is automatically actuated through a given cycle of operation and which cycles of operation are diagrammatically illustrated in Fig. 13. In said Fig. 13, the several positions of the tools are indicated and identified along with the path of movement that they follow from a retracted quiescent position to and through the tooling cycle which includes paths of movement wherein the tools moves rapidly, slowly while effecting a cutting operation, and then rapidly from the work to its initial quiescent position and which latter movement may be through angularly related paths.

The several tools are respectively indicated by the numerals 1, 2, 3 and 4 with the said numerals followed by a letter of the alphabet indicating the position of said tools at the beginning and ends of the several paths of movement followed by the tools in which either the direction of tool movement changes or the speed of movement of the tool changes or is adjusted. The several tool heads will now be specifically identified and its construction generally pointed out, following which one of said tool heads will be specifically described along with the control means for that head and a detailed description of the control means for the specifically described head. It is deemed that this method of specifically describing the invention will clearly set forth the complete machine since the said several tool heads and their specific control mechanism are substantially a duplicate of one another.

Referring now to Fig. 1 the side housing 27 is provided on its forward face with guides 50 and 51 on which is mounted a tool head indicated in general by the reference numeral 52 and which tool head will be described in detail hereinafter. This tool head 52 carries a tool 53 and which is the tool in Fig. 13 indicated by the numeral "1."

The side housing 28, similar to side housing 27, is provided vertically of its face with guides 54 and 55 on which is mounted left-hand side head indicated in general by the reference numeral 56. The side head or tool head 56 is provided with a pair of tools 57 and 58 which are in fixed relation to one another and for all general purposes may be regarded as a single tool. These tools are indicated in the diagram in Fig. 13 by the numeral "3."

Carried by the side housings 27 and 28 near the upper end thereof is a rail 59 provided on its forward face with guides 60 and 61. The guides 60 and 61 support a central boring and facing tool head indicated in general by the reference numeral 62. The tool head 62 is provided with a ram 63 in which is mounted for rotation a spindle 64 carrying a pair of tools 65 and 66. The tool 65 is a facing tool for providing the face 47 on the outer end of the hub 31 while the tool 66 is a boring bit for providing the wheel axle bore 33. The tools 65 and 66 of the head 61 are again arranged in a definite relation to one another and are indicated by the single numeral "4" in Fig. 13.

Mounted on the rail guides 60 and 61 is a second tool head indicated in general by the reference numeral 67 and may be designated the right-hand rail head. The tool head 67 is provided with a single tool bit 68 and effects the facing 48 on the wheel rim 34. The tool bit 68 is therefore adapted to traverse the wheel flange 34 from the outer perimeter thereof toward the wheel axis. This tool is indicated in the diagram of Fig. 13 by the numeral "2."

Since the tools of each of the tool heads 52, 56 and 67 are adapted to move, in general, substantially in the direction of the axis of the wheel or work as well as transversely thereof and since substantially the same means are provided in each of these heads it is deemed sufficient if but one of them be described in detail and such a description will be given with respect to the right-hand side head 52.

The right-hand side head 52 comprises a saddle 69 having formed therein suitable ways 70 (Fig. 6) respectively adapted to engage the right-hand housing ways 50 and 51. The saddle 69 projects laterally outwardly of the housing 27 and its way 50 to have secured thereto the means for effecting the translation of said saddle as well as the means for effecting the translation of the ram as will presently be made clear.

Secured to the saddle 69 is a gear housing 71 providing bearings 72 and 73 for a shaft 74 which has formed integral therewith or secured thereto a worm 75. The shaft 74 is suitably connected as by a sleeve 76 with the shaft 77 of a D.-C. motor 78. The motor 78 is secured to the housing or bracket 71 in any suitable or desirable manner such as by attaching legs 79' projecting therefrom. Carried by the motor 78 at the outer end thereof is a tachometer 79 (Fig. 8) connected with and driven by the motor shaft 77.

Within the housing 71 is a worm wheel 80 keyed or otherwise secured to a worm wheel shaft 81 journaled at its inner end in a bearing provided by the housing 71 and at its outer end provided by a plate 82 secured to and carried by the housing 71. Outwardly of the housing 71 and its cover plate 82 the shaft 81 has keyed or otherwise secured to it a gear 83 meshing with a pinion 84 journaled on a stud 85 secured to and carried by the housing closure plate 82. The pinion 84 in turn meshes with a gear 86 which has projecting from it a sleeve 87. The gear 86 through its sleeve 87 is splined to the outer end 88 of a driven shaft 89. The driven shaft 89 is journaled in anti-friction bearings 90 and 91 carried by the saddle 69.

The gear sleeve 87 is provided with a circumferential groove 92 receiving shifter shoe 93 mounted on an arm 94 arranged to be eccentric of a stud 95 rotatably journaled in a plate 96 carried by a gear guard 97 (Fig. 4). The stud 95 projects beyond its carrying plate 96 to receive a lever or handle 98 whereby the stud 95 may be rotated or oscillated for effecting a movement of the shifter shoe 93 and thereby a sliding movement of the sleeve 87 and gear 86 for interrupting the gear train and thereby disconnecting the driving shaft 89 from the motor 78.

The driving shaft 89 extends inwardly toward the vertical axis of the side housing 27 and has keyed or otherwise secured to its inner end a bevel gear 99 meshing with a complementary bevel gear 100 (Fig. 7) formed integral with or secured to a spur gear 101 which in turn is formed integral with or secured to a stud 102. The stud 102 is suitably journaled in anti-friction bearings 103 carried by a rearwardly projecting lug or extension 104 from the saddle 69. The lug or extension 104 is located substantially mid-way of and between the housing guides 50 and 51.

The said lug or extension 104 of the saddle 69 is further provided with an aperture in the ends of which are mounted anti-friction bearings 105 receiving the reduced end 106 of a lead screw 107. The lead screw 107 is utilized for raising and lowering the saddle 69 together with the ram carried by said saddle and the said screw 107 has keyed or otherwise secured to its upper end a gear 108 meshing with the compound gear spur pinion 101.

The lead screw 107 depends from the saddle lug or extension 104 and is threadedly received simultaneously by a pair of sleeve nuts 109 and 110 (Fig. 16). The sleeve nut 109 is clamped in position by a clamping cap 111 which embraces the sleeve 109 and is secured to the side housing 27 below the ends of the side housing ways 50 and 51 as by means of suitable bolts 112, see Fig. 1. The said sleeve nut 109 is provided at its lower end with a radial flange 113 in face abutment with a similar radial flange 114 at the upper end of the sleeve nut 110. The said flanges 113 and 114 are utilized as the means for attaching the sleeve nuts to one another for which purpose bolts 115 are employed to pass through enlarged perforations 115' in the sleeve nut flange 114 and be threaded into the sleeve nut flange 113. By this construction, the sleeve nuts may be actuated relative to one another to take up back lash between the said sleeve nuts and lead screw before being secured by the bolts 115. Secured to and projecting, respectively, from the sleeve nuts 109 and 110 are suitable protecting guard sleeves 116 and 117 in which the screw 107 is encased to protect it from dirt, moisture, and accidental damage.

From the foregoing it will now be appreciated that there has been provided a translating mechanism from the motor 78 to the lead or elevating and lowering screw 107 that is nonadjustable as to speed insofar as use is made of change gears, pick-off gears, or clutches for interposing adjustable speed trains. It should be noted however that the speed of the motor 78 is variable or adjustable from a maximum of 3600 R. P. M. downwardly whereby the lead or raising and lowering screw 107 may be rotated for effecting the movement of the saddle 69 at rapid traverse rates as well as at slow tooling rates as will later become evident.

The saddle 69 is provided with a guide way 118 receiving the guiding tongue 119 of the ram 120. It will be understood that the saddle guide way 118 for the ram 120 is formed at substantially right angles to the saddle guide way 70 receiving the side housing guides 50 and 51.

In order to actuate the ram 120 the saddle 69 has secured to its projecting portion a second bracket or gear box 121 (Fig. 4) which is substantially identical in construction to the gear box 71. The gear box 121 supplies bearings 122 and 123 (Fig. 5) in which is journaled a shaft 124 having integral therewith or secured thereto a worm 125. The worm 125 is suitably connected, as by a coupling 126, with the shaft 127 of a D.-C. electric motor 128. Any suitable or desirable means may be employed for connecting the motor 128 to the bracket or gear box 121, such for example, legs 128'. The motor 128, similar to the motor 78 carries at its outermost end a tachometer 129 which has its rotating mechanism connected with the motor shaft 127 to be driven thereby.

Extending transversely of the bracket or gear box 121 is a shaft 130 suitably journaled in bearings provided by said bracket or gear box 121 and a closure plate 131. The shaft 130 has keyed or otherwise secured to it a worm wheel 132 with which is meshed the worm 125 and the shaft 130 projects forwardly of the gear box supporting and closure plate 131 to have keyed or otherwise secured to its projecting end a gear 132'. The gear 132' meshes with a pinion 133 loosely mounted on a stud 134 carried by and outwardly projecting from the plate 131. The pinion 133 in turn meshes with a gear 135 which has integral therewith a sleeve 136. Through the sleeve 136 the gear 135 is keyed through a splined portion 137 to a driven shaft 138. The driven shaft 138 is suitably journaled in anti-friction bearings 139 and 140 carried by the saddle 69.

The gear sleeve 136 is provided with a circumferential groove 141 adapted to receive a shifter shoe 142 (Fig. 7) carried by an arm 143 at the inner end of a rotatable or oscillatable stud 144. The stud 144 is rotatably mounted in a plate 145 and projects therebeyond to have secured thereto a lever or handle 146 whereby said stud 144 is rotated. The plate 145, similar to the plate 96, is secured to and carried by gear guard 97 all as clearly illustrated in Fig. 8.

The driven shaft 138 has secured thereto, intermediate its ends, and preferably adjacent the bearing 139, a gear 147 which meshes with a pinion 147' which in turn meshes with a gear 148 keyed or otherwise secured to a lead screw 149. The lead screw 149 is provided inwardly of the gear 148 with a reduced portion 150 (Fig. 5) journaled in bearings 151 carried by a transverse or web portion 152 of the saddle 69. The lead screw 149, similar to the screw 107, is threaded into a pair of sleeve nuts 153 and 154. The sleeve nut 153 is provided with a radial flange 155 in face abutment with a similar radial flange 156 on the sleeve nut 154. The sleeve nut flange 155, in addition, is in face abutment with a projecting end or web portion 157 from the ram 120 with said sleeve nuts 153 and 154, through suitable screws or bolts 158, passing therethrough into the web 157, secured to the said projecting end or web portion 157.

From the foregoing it will now be noted that the ram 120 is driven from the motor 128 through a gear train and lead or in and out screw which is quite similar to the gear train between the saddle screw 107 and its actuating motor 78. It will further be noted that the gear train to the ram screw 149 is non-adjustable as to speed said adjustment being obtained by adjusting the speed of rotation of the motor 128 which as will later be made clear is obtained by varying the voltages to the same.

As disclosed in the tooling diagram on Fig. 13 the tool of the right-hand side head moves at a rapid rate from position 1–A to 1–B whereupon the tool travels downwardly and slightly outwardly for forming the peripheral face or tread of the car wheel. This path of movement is between the points 1–B and 1–C and is effected at a cutting rate which is considerably slower than the rapid traverse rate. Beyond the position 1–C the tool travels to the position 1–D which is through an arcuate path forming the fillet between the car wheel peripheral face or tread and the radial flange at the back side or end of the wheel. While moving through this arcuate path the tool feed is at a rate less than the feed rate between the positions 1–B and 1–C. The tool upon reaching the position 1–D is rapidly retracted from the work to the position 1–E whereupon the tool is rapidly elevated to its initial position 1–A. In order to cause the tool to follow these paths there are provided two mechanisms one a sequence control head whose primary function is to change the rate of movement of the tool from rapid traverse to feed and feed to rapid traverse as well as control the direction of rapid traverse while the second control mechanism is a contour head which controls the rate and direction of movement of the tool during the feeding rate of movement.

These control mechanisms are respectively indicated, in general, in the drawings by the reference numeral 159 for the sequence control head and the reference numeral 160 for the contour control head. Each of these control mechanisms 159 and 160 is carried by the upper end of a bracket 161 (Fig. 3) secured to the ram 120 by any suitable or desirable means, such as bolts 162.

The mounting of the control mechanisms 159 and 160 on the bracket 161 may take any suitable or desirable form, such for example as illustrated in Figs. 3 and 15 wherein use is made of a mounting head 163 secured to the bracket 161 by bolts 164 in such manner that the said head 163 has a limited amount of adjustment on the bracket 161. The mounting head 163 is provided at each end thereof with a split clamping collar 165 and 166 in the former of which is disposed a stud 167 integral with or carried by the housing 168 of the sequence head or control mechanism 159 while in the latter clamping collar a similar stud 169 is received projecting from the enclosing housing 170 of the contour head or control mechanism 160. The split collar 165 is adapted to grip the stud 167 through the medium of a clamping bolt 171 while the split collar 166 is similarly adapted to clamp the stud 169 through the medium of a bolt 172.

The control mechanism or sequence head 159, in addition to the housing 168, is provided substantially centrally thereof with a body member 173 which may conveniently be formed integral with the mounting stud 167. The housing member 168 and body member 173 are secured to one another by means of bolts 174, see Fig. 12. The body member 173 is provided substantially centrally thereof with a bore 175 and which bore extends from the one end of the body member inwardly to a point short of the clamping stud 167. Extending into the clamping stud from the bore 175 is a smaller diameter bore 176 having at its inner end a base 177. The housing main bore 175 is provided near the ends thereof with bushings 178 and 179 forming guide bearings for bearing portions 180 and 181 for the sequence head finger 182. The finger 182 is provided between the bearing portions 180 and 181 with an enlarged central portion 183 and is provided beyond the bearing 180 with a reduced stem portion 184 while forwardly of the bearing 181 the finger has a tapered contacting point 185. In assembly the finger stem portion 184 is disposed in the body portion reduced diameter bore 176 and abuts with one end of a coil spring 186 which abuts on its other end with the said reduced bore base 177. In practice the spring 186 is maintained under compression.

The body member 173 is provided substantially centrally thereof with a lateral opening 187 communicating with the center bore 175. Extending through the said body member lateral bore is an abutment or switch arm 188 secured to the finger central portion 183 as by screws 189, see Figs. 9 and 12.

The body member 173 is substantially rectangular in cross-section and has secured to its upper and lower surfaces pairs of arms 190—191 and 192—193. The arms 190 and 191 carry between them a switch 194 from which projects a spring biased contact or push button 195 as is usual practice. The arms 192 and 193, likewise, carry between them a switch 196 having projecting from its housing a spring biased push arm or button 197. The switches 194 and 196 are of the usual construction of limit switches which complete electrical circuits on depression of the push buttons 195 and 197 with said circuits being broken on the outward movement thereof by their springs.

In order to protect the said switches 194 and 196 the housing 168, generally cylindrical in cross-section, has its ends closed by suitable end plates 198 and 199 each of which is held in its closed position, respectively, by a nut 200 and 201 threaded on to the ends of the body member 173.

With the control device or sequence head in its free or normal position the spring 186 forwardly urges the finger 182 to the position shown in Figs. 9 to 12, inclusive, whereby the abutment or spring arm 188 is engaging and depressing the push button 195 for closing the switch 194. Upon the finger point 185 engaging an abutment, as will later be made clear, the said finger is inwardly, axially moved for opening the switch 194 and in certain conditions is retained in the position where both the switches 194 and 196 are open while in other circumstances the finger 182 is sufficiently inwardly axially moved to cause the abutment or switch arm 188 to engage the push button 197 and thereby close the switch 196. These switches control and operate control mechanisms for effecting and operating the saddle motor 78 and ram motor 128.

The control device or contour head 160 illustrated in detail in Figs. 22 and 23 has at one end of its housing 170 a body member 203 from which projects the clamping stud 169. Carried by the body member 203 are four electromagnets 204, 205, 206 and 207 each of which is mounted for adjustment axially of housing 170. Any suitable or desirable means may be employed for this purpose such for example as illustrated in Fig. 22 comprising a threaded bolt 208 rotatably secured to each magnet and receiving an adjusting nut 209 for retracting each magnet relative to a coil spring 210 that determines the ultimate forward position of the magnet.

Carried by the housing 170 at its other end is a diaphragm 211 provided with a chuck 212 into which is secured one end of a stylus 213. Also carried by the diaphragm 211 is an armature plate 214 so positioned relative to the housing 170 and magnets 204–207, inclusive, as to have therebetween a gap 215.

These parts are so arranged that the diaphragm 211 is adapted to be deflected upon deflection of the stylus 213 and thereby vary the gap 215 relative to each of the magnets 204–207 inclusive.

Depending upon the gap relative to the several magnets depends the rotation of the saddle motor 78 and ram motor 123 as well as depends whether these motors are rotated simultaneously or individually, as will later be made clear.

The housing 170 is provided with electrical outlets 216 and 216' whereby suitable wire connections may be made with respect to the several magnets 204-207, inclusive. In order to prevent over deflection of the diaphragm 211 and the armature 214 the body member 203 has projecting from it toward the diaphragm a stop pin 217. The diaphragm 211 and the armature 214 are mounted in operative position by an end closure plate 218 through which the diaphragm chuck 212 projects to receive the stylus 213.

The sequence head finger 182 and the contour head stylus 213 are each operated relative to control dogs and a contour plate. This mechanism comprises a supporting bracket 219 (Fig. 15) secured to and depending from a convenient portion of the machine, here shown as the rail 59. The bracket 219 is provided in its forward face with a dove tail guide way 220 (Fig. 2) receiving a correspondingly shaped guide 221 inwardly projecting from a slide 222. The slide 222 carries the mechanism for engagement by the sequence head and contour head.

As shown in Figs. 14 and 15 the slide 222 has superimposed thereon a dog plate 223 which in turn, near its inner end, left-hand end in Fig. 14, carries the contour plate 224. Outwardly of the contour plate 224 the dog plate 223 has superimposed thereon a lockout or guard plate 225. The contour plate 224, see Fig. 14, has the operative edge 226 formed to the contour or outline to be given the periphery or tread 49 of the car wheel and at the same time is provided, at the bottom thereof, with the portion 227 that determines the fillet between the said tread 49 and car wheel flange 36, while the operative edge 226 has at its upper end an inclined portion 226' for a purpose later to be made clear.

In the specific embodiment of the invention illustrated in this application the contour plate 224 roughs out the tread 49 by the tool or tool bit 53 while accurately forming and finishing the fillet. The tread 49 is finished by the tool 58 of the left-hand side head 56. It should be further noted that the rear surface of the car wheel flange 36 is finished by the tool or bit 58 of said left-hand side head 56. As was noted above the left-hand side head 56 operates in substantially the same manner as the right-hand side head and has substantially the identical control that the right-hand side head utilizes all as is clearly disclosed in Fig. 1.

The lockout plate 225 for convenience is provided with a forward edge 228 which is substantially identical in outline with the operating edge 226—227 of the contour plate 224.

Mounted on the dog plate 223 is a pair of dogs 229 and 230 while mounted on the lockout plate 225 is a pair of dogs 231 and 232. Each of the dogs 229-232, inclusive, has a top surface 233 which lies in the same plane and is utilized for inwardly actuating the sequence head finger to a position for closing the limit switch 196 through the switch arm or abutment 188. The operative surface of the lockout plate 225 is such that the sequence head finger 182 is held in a central position with each switch 194 and 196 open while the face of the dog plate 223 is at such a level that the coil spring 186 urges the finger 182 to the position illustrated in the drawings, namely, the closing of the limit switch 194 through the switch arm or abutment 188.

As was noted above the tool head 52 roughs out the wheel tread 49 and finishes the fillet between this tread and the flange 36 through the tool bit 53 carried thereby, while the tool head 56 finishes the tread 49 and finishes the outer surface of the flange 36 and at the same time rounds or breaks the corner between the rim face 48 and the wheel tread 49 through the tool bits 57 and 58 associated with the said tool head 56. From this it will be seen that the operating means for the sequence heads and contour heads of the tool heads 52 and 56 must bear a definite relation to one another and that the dog plates, lockout plates and contour plates must likewise be similarly related. In order to accomplish this the rail 59 carries at its other end a mechanism substantially identical with that above described and including the slide 222 and the parts carried thereby and which parts are indicated by the same reference numeral used above with the addition thereto of a prime (').

From the foregoing it will be appreciated that the tool heads 52 and 56 must bear a definite relation to one another to produce the wheel tread 49 to the desired size and shape and therefore the control mechanisms, particularly the sequence head 159 and the contour head 160 of the tool head 52 must bear a definite relation to the sequence head 159' and contour head 160' of the tool head 56 and must be accurately related. Specifically this relation is established by the adjustment of the dog carrying slides 222 and 222'.

It is sometimes necessary to adjust these slides, for example, after tool bit wear, in order to clean up the wheel treads should, for some reason, the tread be provided with comparatively shallow blow holes that must be cleaned out and in order to provide the machine with flexibility for producing different size wheels. From this it follows that an adjustment of the slide 222 toward the axis of the wheel or work piece must be followed by a similar adjustment to be given to the slide 222'. Any suitable or desirable means may be provided for accomplishing this function that shown in the drawings and presently to be described being preferred.

Accordingly, each of the brackets 219 and 219' is provided centrally therethrough with an opening 234 and 234' (Fig. 15). The ends of the brackets 219 and 219' are respectively provided with bearings or journals 235—236 and 235'—236'. Rotatably mounted in said journals is a screw shaft 237 having near one end thereof screw threads 238, right-hand threads for example, and near the other end thereof screw threads 238', for example, left-hand threads. Each of the slides 222 and 222' is respectively provided with a projecting bracket 239 and 239' which brackets are in turn provided at their outer ends, respectively, with a right-hand nut 240 and a left-hand nut 241. The said nuts 240 and 241 are respectively in threaded engagement with the threaded portions 238 and 238' of the screw 237. In order to actuate the screw 237 it has pinned or otherwise secured to one end a hand crank or the like 242.

From the foregoing it will be appreciated that rotation of the screw 237 in a given direction will cause the slides 222 and 222' together with the parts carried thereby to be actuated toward or from one another while rotation of said screw 237 in the opposite direction will correspondingly oppositely actuate the said slides 222 and 222'.

By this mechanism if the slide 222 is actuated toward the work to cause the ram of tool head 52 to move further toward the work center before the depth of its cut is reached the ram of the tool head 56 will likewise be actuated toward the center of the work a greater amount than initially set up. By the same token if the slide 222 is outwardly actuated to prevent the ram of tool head 56 from advancing to the previous set position the ram of the tool head 56 will correspondingly be restricted in its approaching movement.

The right-hand rail head 67, as noted above, faces the wheel rim at the face 48 requiring merely a traversing movement of its bit 68 at a slow or feed rate without following a path or cam to provide a contoured surface. Accordingly the said tool head 67 is controlled only by a control device which is substantially identical with the sequence head above described and which sequence head is indicated in the drawings by the reference numeral 159″. The said sequence head 159″ is carried by a bracket 161″ secured to the ram 120″ of the tool head 67. The control mechanism or sequence head 159″ has its finger movable relative to a dog plate 243 that is mounted on a portion of the slide 222 so that it maintains its definite fixed relation with respect to the control mechanisms or sequence and contour heads of the tool heads 52 and 56. This construction is believed clearly shown in Fig. 1 with the dog plate 243 of the tool head 67 having shown thereon the dogs, indicated by reference numeral 243′ which are similar in all respects to the dogs 229 and 230, above described, and whose functions are identical in changing direction and rate of movement of the ram 120″.

The central tool head 62 on the rail 59 has no movable saddle such as is utilized by the tool heads 52, 56 and 67 but merely utilizes a ram 244 which corresponds with the rams 120 of the other tool heads. The ram 244 is adapted to descend at a rapid rate to operatively associate the tool bit 66 whereupon its rate of descent is reduced to the usual feeding rate while the tool bit 66 is effecting the wheel or work bore 33. Upon the completion of the bore the facing bits 65 are in engagement with the wheel hub face 47 for cleaning up and effecting the said facing 47. In order to efface any tool marks from the face 47 the ram 244 is provided in its movement with a dwell before being rapidly retracted from the work to the position illustrated in Fig. 1.

In order to effect these movements of the ram 244 use is made of a motor similar to the above described motors 78 or 128 having a control circuit operable through suitable limit switches or other pilot devices indicated in the drawings by reference numerals 245, 246, 247 and 248. These limit switches are adapted, respectively, to be closed by dogs 249, 250, 251 and 252 each carried, adjustably, in a dog channel 252′ formed in the face of the ram 244. Since the details of the control circuit forms no part of the present invention and is conventional practice it is deemed sufficient that the foregoing description is sufficient for accomplishing the movement of the ram 244 in providing the bore 33 and wheel hub face 47.

The various motors for the tool heads 52, 56, 62 and 67 are each under control of manually operated switches or other pilot devices with said pilot devices located at control stations 253 and 254 respectively mounted near the right and left-hand ends of the rail 59, as seen in Fig. 1. The said control stations may be located at other places on the machine or on a suitable support adjacent to but apart from the machine and in fact may be arranged as a pendant carried by the machine as is usual and accepted practice. The various control switches and pilot devices will be specifically identified hereinafter in connection with the description of the control circuit for the right-hand side head 52.

Before specifically describing and pointing out the control circuits for the saddle motor 78 and ram motor 128 it is desired to describe the circuits for supplying the several motors for each tool head with electrical energy as well as the circuit for the work table motor, the circuit for the chuck dogs hydraulic system motor and the circuit for the motor for actuating the lubricating system for the machine; the lubricating system forms no part of the present invention except the interlock between its motor and the other motors utilized in the machine.

Referring to Fig. 18 the power source shown is three phase alternating current connected through a disconnect switch 261 with wires LL1, LL2 and LL3 which are respectively connected with fuses FU1, FU2 and FU3 serving as short circuit protection for the hydraulic system motor. Extending from the fuses FU1, FU2 and FU3 are respectively lines L1, L2 and L3 that terminate respectively at one side of contacts 1OM1, 1OM2 and 1OM3 of a solenoid switch and which contacts 1OM1, 1OM2 and 1OM3 have respectively extending from their other sides wires that connect with terminals T1, T2 and T3 of the hydraulic system motor 262. Extending respectively from the wires L1 and L3 are wires L11 and L31 which terminate on opposite sides of a start and stop switch which includes a normally open stop switch or button 263 and a normally closed stop switch or button 264. In this line are normally closed safety overload switch contacts OLA1 and OLB1 under control of overload elements OLA and OLB in the motor feed wires T1 and T2. The said wires L11 and L31, in addition, include a relay switch solenoid coil 1OM which upon energization closes the normally open contacts 1OM1, 1OM2 and 1OM3 thereby starting the motor rotor 262.

Connected across the start switch 263 is a solenoid switch contact 1OM4 which forms a holding contact for the solenoid coil 1OM so that upon release of the start switch 263 to its normally open position the motor 262 continues to rotate until the stop switch 264 is actuated.

The main current lines LL1, LL2 and LL3 are utilized in various combinations for supplying energy to various step-down transformers for the several motors of the various tool heads as well as energy for operating the control circuits. It is to be understood however that while a plurality of these transformers are disclosed in the drawings that a single transformer of sufficient capacity and the proper characteristics may be utilized and effect the same results.

Specifically and as shown in Fig. 18 lines LL1 and LL3 have respectively extending therefrom wires LL11 and LL31 which include safety fuses FU4 and FU5 with said lines LL11 and LL31 terminating at opposite ends of transformer primary coils 1P310T and 2P310T. It should be noted that the transformers 1P310T and 2P310T energize and cooperate with the secondary coil S310T which supplies energy to main leads or bus wires 265 and 266, see Fig. 21. The energy supplied by the transformer secondary coil S310T and wires 265 and 266 is utilized for controlling the speed or rate of rotation and the direction of rotation of the saddle motor 78 and ram motor 128, and the circuit or circuits disclosed in said Fig. 21 may be termed the motor's rotation circuit. In the feed wire or line 266 is a safety fuse 305FU and across these wires is a solenoid coil 301M of a solenoid switch and which solenoid coil 301M is energized as will later be made clear for closing the contacts of its switch. The energization of the solenoid coil 301M closes contacts 301M1 and 301M2, Fig. 18, for completing a circuit across the wires LL11 and LL31 for thereby energizing transformer primary coils 1P304T and 2P304T which in turn set up a circuit in the transformer secondary coil S304T, Fig. 21, for energizing, as will later be pointed out, the ram motor control mechanism indicated in Fig. 21 by the reference numeral 267.

Also, connected across the lines or wires 265 and 266, Fig. 21, is a solenoid switch solenoid coil 401M, similar to the solenoid coil 301M and to be energized as later pointed out. The energization of the solenoid coil 401M closes solenoid switch contacts 401M1 and 401M2 associated therewith for completing an electric circuit across the lines LL11 and LL31 for energizing transformer primary coils 1P404T and 2P404T, Fig. 18. These primary coils in turn energize and effect a current flow through the transformer secondary coil S404T, Fig. 21, which supplies the current for the saddle motor control mechanism indicated in Fig. 21 by the reference numeral 268.

From the foregoing it will be appreciated that the lines LL11 and LL31 supply energy to the right-hand side head operating motors 78 and 128 as well as supply the current and voltage which determines, particularly as will be pointed out hereinafter, the rate and direction of rotation of said motors. The motors for the left-hand side head 56, the motors of the right-hand rail head and the motor of the rail boring and facing head are supplied with energy in a similar manner.

Accordingly, main current lines or wires LL1 and LL2 have extending therefrom wires LL12 and LL13 respectively having therein safety fuses FU6 and FU7 and terminating at opposite ends of transformer primary coils 1P510T and 2P510T which serve the same functions as the transformer primary coils 1P310T and 2P310T above. Similarly the circuit from the transformer including primary coils 1P510T and 2P510T together with the secondary coil associated therewith energizes solenoid switch coils which respectively close contacts 501M1—501M2 and 601M1—601M2 for thereby energizing, respectively, transformer primary coils 1P504T—2P504T and 1P604T—2P604T. The circuit supplied from the primary coils 1P504T and 2P504T supply the energy for the ram motor of the tool head 56 while the energy supplied from the primary coils 1P604T and 2P604T supply the energy for the saddle motor of said tool head 56.

A similar circuit including wires LL33 and LL23 from main lines or wires LL3 and LL2 having therein safety fuses FU8 and FU9 form a circuit including transformer primary coils 1P710T and 2P710T which serve the same purpose with respect to the saddle and ram motors of the tool head 67 as served by the transformer primary coils 1P310T and 2P310T for the same motors of the tool head 52. The circuit from the transformer primary coils 1P710T and 2P710T energizes a pair of solenoid switches which respectively close solenoid switch contacts 701M1—701M2 and 801M1—801M2 for respectively energizing primary coils 1P704T—2P704T and 1P804T—2P804T respectively effecting and controlling the rate and direction of rotation of the saddle and ram motors of the tool head 67.

Also, extending from the main lines or wires LL3 and LL2 are wires LL34 and LL24 each of which respectively includes a safety fuse FU10 and FU11 with said wires LL34 and LL24 terminating at opposite ends of transformer primary coils 1P910T and 2P910T. The circuit energized from the primary coils 1P910T and 2P910T in part serves the same function as the circuit from the primary coils 1P310T and 2P310T insofar as supplying energy for the motor rotation circuit for the ram motor of the tool head 62, since this tool head has but a single motor, and, in addition, the circuit from the transformer primary coils 1P910T and 2P910T supplies the energy for the sequence control circuit of the motors as determined by the sequence control mechanisms 159. In supplying energy for the ram motor rotation circuit of the tool head 62 the circuit energized by transformer primary coils 1P910T and 2P910T a solenoid switch is energized for closing solenoid switch contacts 901M1 and 901M2 for thereby completing a circuit across wires or lines LL34 and LL24 for energizing transformer primary coils 1P904T and 2P904T which accomplish, as noted above, the same functions for the ram motor of the tool head 62 as accomplished by the transformer primary coils 1P304T and 2P304T for the ram motor of tool head 52.

In order for the circuit energized by primary coils 1P910T and 2P910T, which is under the control of the sequence control mechanisms or sequence heads 159, 159', etc., there is illustrated in Fig. 20 the transformer secondary coil S910T, energized as noted above, by the transformer primary coils 1P910T and 2P910T. The ends of the secondary coil S910T are respectively connected by wires 269 and 270 to feed wires or lines 265' and 266'. The wires or lines 265' and 266' are so designated because they may be continuations of the wires or lines 265 and 266 from the secondary transformer coil S310T of Fig. 21 with said lines illustrated as respectively connected with one another as by wires 265a and 266b connecting Figs. 20 and 21 with one another. The circuit including the transformer secondary coil S910T is provided with a safety fuse FU12.

The feed lines or wires 265' and 266' have connected across them a time delay switch 192M which after a time delay sufficient to warm up the tubes in motor controls 267 and 268 closes switch contacts 192TR in the ladder or line 271 which includes in parallel solenoid switches solenoid coils 196ACR and 196BCR.

The energization of the solenoid coil 196ACR in Fig. 20 closes normally open switch contacts 196ACR1 in a feed wire 272, Fig. 21, connecting the line or wire 266 with the motors contouring control device 273 which is under the control of the contour control mechanism or contour head 160 of the tool head 52. It should be here noted that the control circuit for the tool heads 56 has a similar contouring control device operated by its contouring head 160'.

Before proceeding further with the control circuits operated by the sequence control device and the contouring control device it is necessary that the tie-in between the lubricating motor and table motor be described. Accordingly, and with reference to Fig. 19, there is provided a pair of main feed lines or wires 274 and 275 extending from a commercial source of direct current although this current may be supplied from a transformer operated in conjunction with the above identified transformers or even a portion of said transformers. Suffice it that the said D.-C. lines 274 and 275 are provided across which is the lubricating system motor indicated by the reference numeral 276 and it should be noted that the line 274 has therein a shut-off switch 277. The lubricating system motor 276 is operated by a start button or switch 278 which has one side of its contacts electrically connected with normally closed stop switch or button 279 which in turn has its opposite side connected with one side of normally closed overload switch contacts 2OL1 which switch contacts which has its other side connected to a supplementary feed line or wire 274'. The supplementary feed wire or line 274' is connected through a safety control fuse FU13 with the main feed line or wire 274. The other side of the normally open lubricating motor starting switch 278 is connected with one end of a solenoid switch solenoid coil 2M which has its other end connected to the supplementary feed line or wire 275'. The line or wire 275' is connected through safety control fuse FU14 with the direct current main line or wire 275. From the foregoing it will be seen that the closing of starting switch 278 will complete an electrical circuit in the ladder or line 280 from line 274 through line or wire 274', normally closed overload contacts 2OL1, normally closed stop switch 279, normally open now closed start switch 278, switch solenoid coil 2M and wire or line 275' to D.-C. current main line or wire 275.

The energization of the solenoid coil 2M closes normally open switch contacts 2M1 strapped across the starting switch 278 to act as a holding circuit for said coil upon release of said starting switch 278 and return to its normally open position. The energization of the switch coil 2M also closes normally open contacts 2M2, associated therewith, for completing the circuit in ladder or line 281 which includes the lubricating motor 276 as follows: from main D.-C. current wire or line 274 through overload element 2OL, normally open now closed switch contacts 2M3, motor starting resistance 282, motor armature 276, motor fields 283 to the direct current main line 275. At the same time there is a current flow through wire 284 to a wire 285 which includes solenoid switch solenoid coil A to the main direct current wire or line 275. The energization of the solenoid coil A closes normally open solenoid switch contacts A-1 thereby connecting the wire 285 into the ladder or wire 281 ahead of the motor starting resistance 282 so that the motor operates at its normal speed.

The machine is now in condition for effecting a cyclic operation thereof which may include all of the tool heads or only certain ones thereof depending upon the desires of the operator or the work to be performed. For this reason each control circuit, such as illustrated in Fig. 20, is provided with an on and off switch 286 for connecting it with the entire machine cycle, cutting it out of the machine cycle or conditioning it to operate through its own cycle, and the invention will be further described on the assumption that each of the tool heads is in the complete machine operating cycle and that they have their on and off switch 286 actuated to the closed position, as illustrated in Fig. 20. It is now only necessary to press or close the master cycle switch, indicated in Fig. 20 by the reference numeral 287, and while shown as two separate buttons or switches this is done merely for dual control so that one of said switches may be located at each control station, above referred to and indicated in the drawings in Fig. 1 at 253 and 254.

The master cycle switch 287 is in a ladder or line 288 and has one side thereof connected with the control circuit main line or wire 266' and therefore the one end of the transformer secondary coil S910T through the normally open now closed relay switch contacts 196BCR1, since there contacts were closed upon the closure of contacts 192TR which energized the switch solenoid coil 196BCR. The other side of the master cycle start switch 287 is connected with the control circuit main line or wire 265' through relay switch solenoid coils 1MS, 2MS and 3MS and through said wire 265' with the other end of the transformer secondary coil S910T. At the same time a circuit is completed upon the closing of the master cycle start switch 287 including, see Fig. 20, from the control circuit main line or wire 266' through normally closed manually operable low traverse switch 289 (whose function will be subsequently described), normally closed manually operative high traverse switch 290 (whose function will be later described), wire 291, supplementary direct current feed line or wire 266''', normally closed solenoid switch contacts 134CR1, ladder or wire 292, normally open now closed relay switch contacts 1MS1 in individually head manually operated switch bridging circuit, on and off, now on, switch 286, normally closed overload contacts 301OL1 and 401OL1, relay switch solenoid coils 133ACR, 133BCR and 133CCR, supplementary D.-C. control circuit return line or wire 265'', normally closed stop switches 293, and normally open now closed relay switch contacts 1M2, closed by mechanism to be presently described, to the control circuit return line or wire 265' and other end of the transformer secondary coil S910T. It should be here noted that the multiplicity of cycle master stop switches 293 is merely for the purpose of locating stop switches at strategic points on the machine such for example as at each of the control stations 253 and 254 as well as at the main control panel or panels contiguous to or remote from the machine as is usual practice. It will be appreciated that the closing of the switch 1MS1 was accomplished by the energizing of the solenoid 1MS. It should be noted that the overload contacts 301OL1 and 401OL1 are respectively in the circuits of the ram motor 128 and the saddle motor 78 and are safety devices to protect the said motors.

At the time the direct current circuit, Fig. 19, was turned on through the switch 277 ladders or wires 294, 295, 296 and 297, extending between sub-leads or wires 274' and 275', were energized. In the ladder or wire 294 is a normally closed relay switch contact RR1 and a relay switch solenoid coil 1AR which is energized for a purpose to be later pointed out. The ladder or wire 295 includes a normally closed relay switch contact 1A1 and a relay switch solenoid coil 2AR which is energized for a purpose later to be made clear. Ladder or wire 296 includes normally closed relay switch contacts 2A1 and a relay switch solenoid coil 3AR which is energized for a purpose later to be made clear. The ladder or wire 297 also has therein a normally closed relay switch contact 3A1 together with a resistance, Res. A, as well as a field accelerating relay switch solenoid coil FF which functions in the work table motor circuit as will presently be made clear. These ladder circuits 294 to 297, inclusive, are utilized for cutting out the starting resistance and as an interlock between said starting resistance and motor.

At the time of starting the lubricating system motor 276 and energizing the relay switch solenoid coil 2M the work table motor starting circuit through a ladder or wire 298 between the D.-C. current sub-feed wires or lines 274' and 275' was energized and which starting circuit, see Fig. 19, includes normally open now closed switch contacts 2M2, normally closed now closed overload contacts 1OL1, normally closed now closed overload contacts 1OL1, normally closed now closed pressure switch contacts under control of the hydraulic medium for the table jaws, and which switch contacts are identified as OPS, normally closed now closed pressure switch contacts under the control of the lubricating medium, and which contacts are identified by the reference character OPS1, a pair of manually operable stop switches 299, located respectively at the control stations 253 and 254, a wire 300, normally open now closed relay switch contacts 1MS2, a wire 301, manually operable jog switches 302, respectively located at the control stations 253 and 254, and a relay switch solenoid coil RR. The energization of the solenoid coil RR closes normally open switch contacts RR1 which are connected across the wires 300 and 301 and forms a holding circuit for said relay switch solenoid coil RR wherefore the circuit is maintained complete should for some reason the solenoid 1MS become deenergized and particularly for holding this circuit if the table motor is operated independently of the tool head's motors as through the actuation of either one of a pair of manually operated work table motor starting switches 303 which are respectively located at the control stations 253 and 254 and which switches 303 are connected across the wires 300 and 301 for completing the motor starting circuit when the solenoid coil 1MS is deenergized thereby opening normally open switch contacts 1MS2.

The energization of the relay switch coil RR also closes normally open switch contacts RR2 for completing a circuit between the wire 300 and the sub-lead 275'. This circuit is from the wire 300 through normally open now closed switch contacts RR2, sub-ladder or wire 304, connecting wire 305, sub-ladder or wire 306, normally open now closed switch contacts 1AR1, 2AR1 and 3AR1, respectively closed by the ladders or wires 294, 295 and 296 above detailed, and a relay switch coil 1M. The energization of the solenoid coil 1M closes a normally open contact 1M1 in the sub-ladder or wire 304 for thereby establishing a holding circuit for the relay switch coil 1M upon opening of the contacts 1AR1, 2AR1 and 3AR1 as will presently appear. It should be appreciated that the energization of the relay switch coil 1M takes place almost immediately after the closing of the cycle master start switch 287, Fig. 20, which closed the interlock relay switch interlock contacts 1MS2.

The energization of the relay switch solenoid coil 1M effects the starting of the table motor 39 through the energization of the ladder or wire 307 between the D.-C. current main feed lines or wires 274 and 275 and which ladder or wire 307 includes overload element 1OL, field accelerating relay switch solenoid coil FA, overload relay solenoid coil 1OL, normally open now closed relay switch contacts 1M3, armature of the table motor 39, commutating field 308, starting resistance 309, and motor series field 310.

The starting resistance 309 is gradually cut out of the circuit in bringing the table motor 39 to speed and which is not new, per se, in the present application but is under the control of the relay switch operated by the solenoid coil 1M. Accordingly normally open now closed contact 1M4 in the ladder or wire 311 effects a current flow through normally closed now closed relay switch contacts 1AR2 and a relay switch solenoid coil 1A. The energization of the coil 1A closes normally open switch contacts 1A2 which upon closing cut out a portion of the starting resistance 309. The energization of the switch solenoid coil 1A opened the normally closed contacts 1A1 in the ladder or wire 295 and deenergized relay switch solenoid coil 2AR thereby permitting the closing of normally closed relay switch contacts 2AR2 in a sub-ladder or wire 312 and which sub-ladder or wire 312 includes relay switch solenoid coil 2A. The closing of the switch contacts 2AR2 is delayed sufficiently to permit the motor to reach the speed with the portion of the starting resistance controlled by contacts 1A2 cut out, whereupon the energization of the solenoid switch coil 2A closes contacts 2A2 for cutting out a further portion of said starting resistance 309. The energization of the solenoid coil 2A opened the normally closed contacts 2A1 in ladder circuit 296 for thereby deenergizing relay switch solenoid coil 3AR. The deenergization of the solenoid coil 3AR permits the closing of normally closed contacts 3AR2 in sub-ladder or wire 313 and which ladder or wire 313 includes a switch solenoid coil 3A. The contacts 3AR2, similar to the contacts 2AR2 are delayed in their closing to permit the motor to accelerate to the point where the additional starting resistance cut out indicates. Upon the final closing of contacts 3AR2 and energization of the solenoid coil 3A normally open contacts 3A2 are closed thereby completely eliminating from the motor circuit the starting resistance 309 and permitting the table motor to run at its maximum or desired speed. The energization of the switch solenoid coil 3A also opened normally closed contacts 3A1 in the ladder or wire 297 thereby energizing the relay switch solenoid coil FF for cutting out the accelerating resistance.

As shown in Fig. 19 the motor armature and commutating field circuits have connected therearound, as is usual practice, the shunt-field circuit in which is disposed a rheostat SR for determining the rate of rotation of the motor at the speed proper to effect stock removal which depends on the kind of material being machined and the kind of tools used.

It should be noted that there is provided in the wires 300 and 301 a series of opposed attaching points respectively indicated by reference numerals 300' and 301' which are employed for connecting into the circuit the sequence control circuits of the various tool heads and constitutes an interlock for said heads when they are individually actuated through their cycles upon actuation of a manually operable push button or the like, as will later be pointed out in connection with the tool head 52 here being specifically described.

Associated with each of the control stations 253 and 254 and particularly the portions of said control stations assigned to the respective tooling heads are indicating signals in the form of lights which indicate the condition of the control circuit and the operation of the tool head taking place. Accordingly, and referring to Fig. 20, the closing of the relay switch 196BCR1 in the wire or line 266' to effect a flow therethrough and the flow of current through the circuit including the master cycle start switch 287 effected a current flow through the wire 314 that connects the control circuit main lead 266' with the sub-lead 266'' and the sub-lead 266'''. This flow of current in the sub-lead 266''' is through normally open now closed relay switch contacts 132CCR2, closed as will presently be made clear, to a ladder or wire 315 which has therein the signal light R1. The current flows from the ladder or wire 315 through a connecting wire 316 to a sub-ladder or wire 317 that extends from ladder or wire 292 and which sub-ladder or wire 317 has therein a relay switch solenoid coil 135CR. In the ladder or wire 315 is normally open now closed relay switch contacts 135CR1 which acts as a holding contact for the relay switch solenoid coil 135CR in supplying current thereto from the sub-main feed wire 266'' when the sub-feed wire 266''' is deenergized.

The energization of the signal R1 indicates that the ram of the tool head 52 is to be actuated or is being actuated toward the work at a rapid rate. At this time the sequence head finger 185 is resting on the dog 229 thereby closing the limit switch 196, which is identified in the wiring diagram of Fig. 20 by the reference character 132LS. At this time the limit switch 194, indicated in the wiring diagram of Fig. 20 by the reference character 131LS, is open for thereby deenergizing the control relay switches' coils 304CR and 404CR. The closing of the limit switch 132LS in the ladder or wire 318 energized relay switches solenoid coils 132ACR, 132BCR and 132CCR. It is the closing of the solenoid coil 132CCR that closed the normally open contacts 132CCR2 above to energize ladder or wire 315. At this time current from the transformer secondary coil S304T, Fig. 21, is supplying current through a plurality of wires to the ram motor control 267 at various voltages through safety fuses 301FU, 302FU, 303FU and 304FU in certain of which wires are resistances 307R and 308R. The motor control mechanism 267 is a commercial product produced by electrical equipment control mechanism manufacturers, such as, The General Electric Company whose product is commercially known as a "Constant Current Thymotrol" and this control mechanism forms no part of the present invention except in combination. Also connected into the motor control 267 is a wire 319 from the control circuit main lead or wire 266. Extending from the motor control 267 is a wire 320 that terminates in the main feed wire or line 265 and which wire has therein normally open now closed relay switch contacts 303CR1, previously closed as will presently be explained, fixed resistance 325R and relay switch solenoid coil 301TR. The energization of the solenoid coil 301TR is delayed by a delaying circuit including wire 320' extending from wire 320 and including a fixed resistance 326R and a condenser 307C. The energization of the solenoid coil 301TR closes relay switch contacts 301TR1, after a definite time delay, in ladder or wire 321 between control circuit wires 266 and 267. The ladder or wire 321 also includes a relay switch solenoid coil 301M and it is the energization of this solenoid coil 301M that closes the contacts 301M1 and 301M2, Fig. 18, for completing the circuit to the motor control mechanism transformer primary coils 1P304T and 2P304T. It should be noted that a similar mechanism associated with each of the tool heads 56, 62 and 67 rotation control circuits closes the contacts for their ram motors control mechanisms. The closing of the relay switch contacts 303CR1 was accomplished by the energization of the relay switch solenoid coil 303CR in Fig. 20. The energization of the said solenoid coil 303CR was accomplished when the ladder or wire 292 was energized upon the closing of the master start switch 287 and which ladder or wire energized relay switch solenoid coil 133ACR for thereby closing normally open relay switch contacts 133ACR1 ahead of said solenoid coil 303CR and also ahead of relay switch solenoid coil 403CR.

The motor control 267, see Fig. 21, has extending therefrom wires 322 and 323 respectively connected with the opposite terminals of the ram motor armature 128 with said wire 323 having a connection with the ground or return wire 265 of the control circuit; the wire or line 322 may be termed the feed wire on the ram motor armature receiving its current from the control mechanism within the motor control 267 while the wire 323 is the return wire to the control circuit wire or lead 265 and the motor control mechanism 267. Also extending from the motor control mechanism 267 is a pair of additional wires 324 and 325 connected with the shunt and field resistances for supplying current thereto which determines both the direction of rotation as well as the rate of rotation thereof. In the said field circuit is a "thyrite" resister indicated by the reference numeral 373R and which "thyrite" resister is utilized to limit the magnitude of inductive voltage which would develop in the shunt-field circuit and hold the same to a value which would not damage the insulation of the motor shunt-field if the current through the motor field were interrupted suddenly, all as is well known.

The current supplied to the shunt-field circuit 324 and 325 is under control of a wire 326 or 327 each of which enters the motor control mechanism 267 for completing a circuit whose other side is formed by a wire 328 from the motor control 267 and which wire 328 receives current from the mechanism within the motor control 267 with the circuits 326—328 and 327—328 having therein resistances that properly proportion the amount of voltage to be used in controlling the ram motor shunt-field circuit 324—325.

The motor control device 267, in effect, places an electrical potential across the lines 326 and 265 with said line 326 being positive and line 265 negative with respect to one another. Similarly, the motor control device 267 places an electrical potential across the lines 327 and 265 with said line 265 being positive and the line 327 negative with respect to one another. The line 326 has therein resistances 318R and 328R while the line 327 has therein resistances 319R and 329R with said resistances in the lines 326 balancing the resistances in the line 327. The current or electrical potential in the line 328 is negative or positive with respect to the potential in line 265 depending upon the resistances in the circuits and whether the resistances in line 326 or the line 327 are connected or latched thereto.

At this time and with the circuit set up as above described the energization of the relay switch solenoid coil 133CCR, above, Fig. 20, and the energization of the relay switch solenoid coil 3A in the sub-ladder or wire 313, Fig. 19, closed the normally open contacts 3A3, Fig. 20, thereby establishing a current flow from the transformer secondary coil S910T through the line or wire 266' through normally open now closed relay switch contacts 196BCR1, wire 329, normally open now closed relay switch contacts 3A3, normally open now closed relay switch contacts 133CCR1, normally closed now closed relay switch contacts 143CR1, branch wire 330, normally closed now closed relay contacts 137BCR1, relay switch solenoid coil 301CR and normally closed now closed relay switch contacts 131BCR1 to the feed line or wire 265' and the other end of a solenoid secondary coil S910T.

The energization of the relay switch coil 301CR closed normally open relay switch contacts 301CR1 and opened normally closed contacts 301CR2, see Fig. 21. The closing of the normally open relay switch contacts 301CR1 latched or connected with the wire 328 a voltage divider circuit which comprises a wire 331 having therein fixed resistances 321R and 322R as well as variable resistance or potentiometer 301VR. The divider circuit 331 is connected with the ram motor tachometer 129 which, as noted above, is mechanically connected with the ram motor armature 128 and upon being driven sets up a balancing current flow for balancing the current flow through the wires 326 and 327. It will be appreciated from Fig. 21 that the closing of the relay switch contacts 301CR1 latched or connected into the wire 328 the resistance 319R and 321R and which are in the circuit having the positive potential across the lines 326 and 328, wherefore the potential is of a positive character causing the motor 128 to rotate in a direction to rapidly feed the ram toward the work. It will be appreciated that this maximum speed is determined by the variable resistance of potentiometer 301VR which, for example, may mean the motor 128 is rotating at a speed of 3600 R. P. M.

As is well understood and pointed out above the tachometer circuit or signal includes the resistances 309R, 310R and 323R which constitute a divider circuit connected across the full voltage output of the tachometer when the ram motor is being rotated at its feeding rate as will later be made clear. Since, at this time, the ram motor is to be operated at its maximum speed certain of the resistances 309R, 310R and 323R are to be short circuited out of the circuit. Accordingly, substantially as soon as the ram moves toward the work the sequence head finger leaves the dog 229 thereby permitting the spring 186 to shift the said finger and open the switch 132LS, Fig. 20, and close the switch 131LS thereby completing a ladder or wire 332 which has therein normally closed low traverse switch 289 and relay switch solenoid coils 304CR and 404CR. The energization of the solenoid coil 304CR opens normally closed relay switch contacts 304CR1 in the divider circuit to the tachometer and closes normally open relay switch contacts 304CR2 thereby cutting out of the divider circuit the resistances 309R and 310R. As a result, the tachometer speed must be increased to increase its generated voltage, making its signal eventually balance the signal established in the divider circuit when the motor rotates at its desired speed for rapidly traversing the ram from its retracted position to a position for operation on the work.

Referring again to Fig. 20 the opening of the sequence head switch 132LS deenergized the solenoid 132BCR thereby establishing a current flow from the main wire or line 266' through low traverse normally closed switch 289, high traverse normally closed switch 290, wire 291, sublead or wire 266''', normally closed now closed relay contact 134CR1, ladder or wire 292 (instead this flow may be from sub-lead or wire 266''', connecting wire 314, sub-lead or wire 266'', normally closed now closed relay switch contacts 132CCR1), sub-lead or wire 266'', ladder or wire 315, normally open now closed relay contacts 135CR1, sub-lead or wire 266''', normally closed now closed relay switch contacts 132BCR1, ladder or wire 333, sub-ladder or wire 334 and relay switch solenoid coil 136CR. The energization of the solenoid coil 136CR closes normally open relay switch contacts 136CR1 and 136CR2 in the ladder or wire 333 setting up this ladder circuit for indicating the next change or operative position of the tool with respect to the work.

The ram continues to move at a rapid rate toward the work, as stated above, until the tool is about to contact the said work whereupon the sequence head finger 182 engages the lock-out or guard plate 225 which pushes the said sequence head finger inwardly against the spring 186 for thereby opening the limit switch, 194 in Fig. 12, 131LS in Fig. 20, for interrupting the ladder or wire 332 and deenergizing relay switch solenoid coil 304CR; whereupon the normally open contacts 304CR2, see Fig. 21, are opened and the normally closed contacts 304CR1 allowed to close thereupon cutting into the tachometer circuit its full resistance 309R, 310R and 323R.

This slows down the rate of movement of the ram toward the work. As pointed out above the sequence head and ram head bear a definite relation to one another and this relation is such that shortly after the sequence head finger engages the lock-out plate 225 the contour head stylus 213 engages the contoured edge or surface 226 of the templet 224. This deflection of the stylus 213, as noted above, changes the gap 215 between the coils 204, 205, 206 and 207 and armature plate 214 thus unbalancing bridge circuits within the motor control mechanism 273, see Fig. 21. The motor control mechanism 273 is energized from the feed line or wire 266 through a wire 272 which has therein the normally open now closed relay switch contacts 196ACR1 and the said motor control mechanism is further energized by a wire 336 from the control circuit feed line or wire 266. The circuit through the control mechanism is normally through the wire or line 337 having therein the normally closed relay switch contacts 101CR1.

The completion of said circuits by stylus deflection through the control mechanism 273 effects a current flow therefrom through wires 338 and 339 which have between them a relay switch solenoid coil 101CR and which coil is thereby energized. The energization of the solenoid 101CR closes contacts 101CR2 in a ladder or wire 340 extending between control circuit wires 266 and 265. The closing of this ladder or wire 340 energizes relay switch solenoid coils 131ACR and 131BCR. The energization of the solenoid coil 131ACR closes normally open contacts 131ACR1 and 131ACR2, Fig. 20, for thereby connecting the control circuit main line or wire 266' with the sub-main line or wire 266'' and at the same time completing a ladder or wire 341 between the control circuit main lines or wires 266' and 265'. This ladder or wire 341 includes normally open now closed relay switch contacts 131ACR1, 133ACR2, and relay switch solenoid coil 103CR.

The energization of solenoid coil 103CR closes switch contacts 103CR1 and 103CR2 respectively in wires 342 and 343, respectively from the left and right-hand sides of the control mechanism 273 for effecting a current flow therethrough, respectively, to the ram motor control mechanism 267 and saddle motor control mechanism 268. The current flow in the wire 342 is through current divider circuit including variable resistance or potentiometer 117P, normaly closed now closed relay switch contacts 104CR1, normally closed now closed relay switch contacts 105CR1, "thyrite" resister 175R, fixed resistance 176R, normally closed now closed relay switch contacts 302CR1 and normally closed now closed contacts 301CR2 to the line or wire 328. Extending from this voltage divider circuit is a line or wire including a variable resistance or potentiometer 104VR, a fixed resistance 177R and normally closed now closed relay switch contacts 304CR1 with said line terminating at the tachometer 129. This voltage divider is in the positive current field for thereby causing the ram motor to rotate in the direction for actuating the tool into the work but at this time at a rate for effecting a cutting action and therefor at a rate much slower than the rate of traverse movement, said cutting rate may, for example, be in the nature of 1200 R. P. M. The current flow through the wire 342 just described is, at this time, also through a wire 344 to the main feed line or wire 266 and the wire 344 has therein a volt meter VI.

The current flow in the wire 343 is connected with a voltage divider circuit, similar in all respects to that just described in connection with the wire 342, with said current flow being through a variable resistance or potentiometer 117P1, normally closed now closed relay switch contacts 104CR2, normally closed now closed relay switch contacts 105CR2, "thyrite" resister 178R, fixed resistance 179R, normally closed now closed relay switch contacts 402CR2 and normally closed now closed relay switch contacts 401CR2 to a line or wire 345 from the saddle motor control mechanism 268. Extending from this voltage divider circuit is a line or wire having therein a variable resistance or potentiometer 105VR, a fixed resistance 180R and normally closed now closed relay switch contacts 404CR1 with said wire terminating at the tachometer 79 of the saddle motor 78.

It will be noted that the circuit just described from the tachometer 79 is substantially identical with the wire or circuit from the tachometer 129 that includes the potentiometer 104VR and terminating in the line or wire 328.

The motor control mechanism 268 is substantially identical to the motor control mechanism 267 and serves the same functions for the saddle motor 78 that is served by the motor control mechanism 267 for the ram motor 128. Accordingly, the motor control mechanism 268 is energized from transformer secondary coil S404T through a plurality of feed lines having therein safety fuses 401FU, 402FU, 403FU and 404FU in certain of which wires are resistances 407R and 408R. Also connected into the motor control 268 is a wire 346 which corresponds to the wire 319 for the motor control mechanism 267 and connects the said motor control mechanism 268 with the control circuit main line or wire 266. Extending from the motor control 268 is a wire 347 that terminates in the main line or wire 265 and which wire has therein normally open now closed relay switch contacts 403CR1, previously closed upon the energization of the relay switch coil 403CR, described above, fixed resistance 425R and relay switch solenoid coil 401TR. The energization of the solenoid coil 401TR is delayed by a delaying circuit, including wire 348 extending from wire 347 and including a fixed resistance 426R and a condenser 407C. The eventual energization of the solenoid coil 401TR closes relay switch contacts 401TR1 in ladder or wire 349 between control circuit main lines or wires 265 and 266. The ladder or wire 349 also includes a relay switch solenoid coil 401M and it is the energization of this solenoid coil 401M that closes contacts 401M1 and 401M2, Fig. 18, for completing the circuit to the motor control mechanism transformer primary coils 1P404T and 2P404T. It should be noted that a similar mechanism associated with each of the tool heads 56 and 67 closes the contacts for their saddle motors control mechanisms.

The motor control 268, similar to motor control 267, has wires 350 and 351 extending therefrom, respectively, connected with opposite terminals of saddle motor armature 78 with said wire 351 having a connection with the ground or main feed line or wire 265. Also extending from the motor control mechanism 268 is a pair of wires 352 and 353 connected with the shunt and field resistances for supplying current thereto which determines both the direction of rotation as well as the rate of rotation of the said saddle motor 78. In said field circuit is a "thyrite" resister indicated by the reference numeral 473R and which "thyrite" resister is utilized for the same purpose as the "thyrite" resister 373R in the field circuit of the ram motor 128.

The current supplied to the shunt-field circuit 352 and 353 is under control of a wire 354 or 355 each of which enters the motor control mechanism 268 for completing a circuit whose other side is formed by the wire 345, above referred to, and which wire 345 extends from the motor control mechanism 268. The circuits 354—345 and 355—345 are each provided therein with resistances that properly proportion the amount of voltage to be supplied to control the saddle motor shunt-field circuit 352—353 in the same manner that the circuits 326—328 and 329—328 control the ram motor shunt-field circuit.

The motor control device 268, in effect, places an electrical potential across the lines 354 and 265 with said line 354 being positive and line 265 negative with respect to one another. Similarly the motor control device 268 places an electrical potential across the lines 355 and 265 with said line 265 being positive and the line 355 negative with respect to one another. The line 354 has therein resistances 418R and 428R while the line 355 has therein resistances 419R and 429R with said resistances in the line 354 balancing the resistances in the line 355. The current or electrical potential in the line 345 is negative or positive with respect to the potential in line 265 depending upon the resistances in the circuits and whether the resistances in line 354 or the line 355 or any portion of said resistances in said lines is connected or latched thereto.

Referring for a moment to Fig. 14 it will be noted that the templet 224 is provided at the upper end of the contour portion 226 with an angular portion 226' which is at an angle of substantially 45° to the horizontal or direction of movement of the ram toward the work. It is this portion 226' of the templet contour 226 that is initially engaged by the contour head stylus 213 which deflects the stylus in such a manner that the ram motor and saddle motor are each brought into play for effecting a downward as well as an inward movement of the tool.

As was noted above, the contouring head or contour control mechanism, per se, forms no part of the present invention except in combination but it is believed a brief description of the operation of this mechanism is desirable. The diaphragm 214 has between itself and each of the magnet coils 204, 205, 206 and 207 a magnetic field whose characteristics or magnitude is varied by an approach of the diaphragm 214 to the magnets. The magnets diametrically opposite one another are the magnets for one motor while the magnets diametrically opposite one another and at right angles to the first pair of magnets controls the second motor. From this it follows that a deflection of the diaphragm 214 directly towards one magnet and away from its diametrically opposite magnet will energize one motor for rotation either for a forward or reverse direction while a deflection of the diaphragm 214 toward the magnets adjacent one another of each pair will effect the rotation of both motors. If this deflection of the diaphragm changes the magnetic fields of the magnets approached similiarly, the two motors will be operated at a similar speed with the cutting tool traveling through a path which is the resultant of the speeds of the two motors or through a path of approximately 45°. It is this condition that is existing at this time and brought into operation when the contour head stylus 213 engaged the templet 224 and particularly the portion 226' of the said templet contour face.

The contour control mechanism or contour head is indicated in the diagram Fig. 21 by the reference numeral 356 which is illustrated as having extending therefrom wires 357 and 358. These wires 357 and 358 are to be regarded as cables since there are wires extending from each of the several magnets and from diaphragm into the control mechanism 273 and which mechanism 273, depending upon the signals and current through the wires or cables 357 and 358, supplies the current in the lines 342 and 343. The mechanism within the control mechanism 273 also determines the polarity of the current in the wires 342 and 343 which is determined by the contour head 356.

In view of this when the contour head stylus 213 reaches the base of the templet 45° angle portion 226' the stylus is deflected by the portion 226 in a direction that calls for the saddle motor 78 to operate at a relatively fast speed while the ram motor is operated at a relatively slow speed and at this time in a direction reversely of that previously rotating in traversing the ram toward the work. The said ram and saddle motors each continue to rotate at these established feeds until the bottom end of the templet surface 226 is reached, or the point where the fillet forming portion 227 of the templet path joins the inclined portion 226 thereof. It is at substantially this point that control mechanism or sequence head 168 again comes into play since the guard plate 225 at this point, see Fig. 14, is provided with the dog 231 for again inwardly actuating the sequence head finger against the resistance of spring 186 and thereby closing the limit switch 196, Figs. 1, 9 and 11, or the switch 132LS, Fig. 20.

The closing of the limit switch 132LS is only momentary its function being to change the rate of feed of the tool and work so that an accurate and extremely fine finish may be provided on the fillet of the wheel adjacent its rim as pointed out above. Accordingly, the closing of the limit switch 132LS effects the reenergization of relay switch coils 132ACR, 132BCR and 132CCR for thereby closing normally open relay switch contacts 132BCR2 for completing the following circuit from control circuit main line or wire 266' through normally open now closed relay switch contacts 131ACR2, connecting wire 314, sub-lead wire 266''', normally closed now closed relay switch contacts 134CR1, ladder or wire 292, sub-lead wire 266'', ladder or wire 333, normally open now closed relay switch contacts 136CR1, sub-lead or wire 266''', normally open now closed relay switch contacts 132BCR2 to the ladder or wire 359 for energizing the signal R3 which indicates that the tool is to be or is feeding at a slow rate of speed. At the same time the relay switch solenoid coils 104CR, 137ACR and 137BCR are each energized and which have their other ends connected to the return main feed line or wire 265'.

The energization of the relay switch solenoid coil 137ACR closes normally open switch contacts 137ACR1 in the ladder or wire 333 for setting up this circuit to maintain the signal R2 energized when the ram is being retracted from the work as will later be made clear. The energization of the solenoid switch coil 137ACR also closes normally open relay switch contacts 137ACR2 thereby connecting the ladder or wire 359 with the sub-feed line or wire 266'' to receive current from the said wire when the circuit in the line or wire 266''' is interrupted as will occur presently. The energization of the solenoid coil 137BCR opens normally closed solenoid switch contacts 137BCR1 in the sub-ladder or wire 317 for thereby rendering the traverse-in circuit including the solenoid switch coil 301CR inoperative.

The energization of the relay switch solenoid coil 104CR opens the normally closed relay switch contacts 104CR1 and 104CR2 in the divider circuits fed by the wires 342 and 343 from the motor control mechanism 273 in Fig. 21. At the same time the normally open relay switch contacts 104CR3 and 104CR4 are closed thereby setting up the divider circuit from the line 342 through normally open now closed relay switch contacts 103CR1, variable resistance or potentiometer 118P, normally open now closed relay switch contacts 104CR3, normally closed now closed relay switch contacts 105CR1, thyrite resister 175R, fixed resister 176R, normally closed now closed relay switch contacts 302CR1 and normally closed now closed relay switch contacts 301CR2 to the wire 328 and the ram motor control mechanism 267. At the same time a divider circuit is now set up through the line or wire 343 through the normally open now closed relay switch contacts 103CR2, variable resistance or potentiometer 118P1, normally open now closed relay switch contacts 104CR4, normally closed now closed relay switch contacts 105CR2, "thyrite" resister 178R, fixed resistance 179R, relay switch normally closed now closed contacts 402CR1 and relay switch normally closed now closed contacts 401CR1 to the line or wire 345 and the saddle motor control mechanism 268. It should be noted that the resistances 118P and 118P1 are set to effect a slower rate of rotation for the ram motor 128 and saddle motor 78 than are the resistances or potentiometer 117P and 117P1 wherefore a slower and finer feed is effected between the tool and work in forming the fillet between the wheel tire or tread and flange. The ram and saddle motors continue to operate at this slower speed until the outer periphery of the flange is reached whereupon the ram motor is rapidly retracted from the work. It being understood that the said motors are under control of the stylus 213 while in contact with the fillet forming portion 227 of the templet 224.

It should be noted that the sequence finger upon leaving the dog 231 permitted the limit switch 132LS, Fig. 20, to open thereby deenergizing the relay switch solenoid coils 132ACR, 132BCR and 132CCR. The deenergization of the relay switch coil 132BCR permitted the normally closed contacts 132BCR3 to close thereby causing a current flow in sub-lead or wire 266''' to ladder or wire 360 for energizing the relay switch solenoid coil 138CR therein. The energization of the solenoid coil 138CR closes normally open relay switch contacts 138CR1 for connecting the ladder or wire 360 with the main feed line or wire 266' for subsequent use.

When the tool reaches the outer end of the fillet the sequence control mechanism or finger 182 is on the dog 232 thereby closing limit switch 132LS, Fig. 20. The closing of the limit switch 132LS reenergized relay switch solenoid coils 132ACR, 132BCR and 132CCR thereby closing relay switch contacts 132BCR4 for completing a circuit to ladder or wire 361. This circuit is from the main line or wire 266' through manually operable low and high traverse switch buttons 289 and 290, wire 291, sub-feed line or wire 266''', normally closed now closed relay switch contacts 134CR1, ladder or wire 292, sub-feed line or wire 266'', ladder or wire 360, normally open now closed relay switch contacts 138CR1, sub-feed line or wire 266''', normally open now closed relay switch contacts 132BCR4 to the ladder or wire 361 which has therein relay switch solenoid coil 139CR. Extending from the ladder or wire 361 is a wire having therein a signal R4 which indicates the ram motor is about to be or is being rapidly retracted from the work. The energization of the relay switch solenoid coil 139CR closes normally open relay switch contacts 139CR1 for thereby connecting the ladder or wire 361 with the sub-feed line or wire 266''.

The energization of the relay switch solenoid coil 139CR also closed normally open relay switch contacts 139CR2 in the wire or sub-ladder 362 extending from the wire 330 to the main feed line or wire 265' for thereby completing a circuit through this wire or ladder as follows. From the main feed line or wire 266' through wire 329 having therein normally open now closed relay switch contacts 3A3, normally open now closed relay switch contacts 133CCR1, and normally closed now closed relay switch contacts 143CR1 to wire 330 and the sub-ladder or wire 362 and which sub-ladder or wire 362 has therein normally closed now closed relay switch contacts 141CR1, normally open now closed relay switch contacts 139CR2, open, but completing the automatic cycle, manually operated take over out button or switch 363 and a relay switch solenoid coil 302CR. The energization of the relay switch solenoid coil 302CR completes a circuit for effecting the reverse rotation of the ram motor 128 and thereby withdraws same from the work.

Referring now to Fig. 21 the energization of the relay switch solenoid coil 302CR opens the normally closed relay switch contacts 302CR1 and closes the relay switch normally open contacts 302CR2 for thereby latching onto the wire 328 the reverse electrical potential in the divider circuit or wire 327. The divider circuit or wire 327 includes fixed resistances 371R and 372R together with the variable resistance or potentiometer 301VR and terminates in the tachometer circuit in the same manner as the divider circuit controlled by relay switch contacts 301CR1 was latched or connected therewith, above. It will be noted that the relay switch contacts 302CR2 connected the motor control circuit into the field circuit 324—325 through the control mechanism 267 in the negative electrical potential portion of the control mechanism thereby effecting the reverse rotation of the ram motor and the withdrawal of the ram tool from the work.

Substantially as soon as the ram motor initiates retraction the sequence finger 182 left the dog 232 whereupon the limit switch 132LS is opened, Fig. 20, and the limit switch 131LS was closed, since the sequence head is now beyond the guard plate 225. The closing of the limit switch 131LS accomplishes the same function as above, namely, an energization of relay switch solenoid coils 304CR and 404CR for thereby opening normally closed relay switch contacts 304CR1 and closing normally open relay switch contacts 304CR2 and cutting out of the tachometer generated current field the resistances 309R and 318R so that the ram motor operates at its maximum speed as established by the potentiometer 301VR for retracting the ram.

The opening of the limit switch 132LS, upon the movement of the sequence finger 182 off of the dog 232, deenergizes the relay switch solenoid coils 132ACR, 132BCR and 132CCR and permitted the closing of the normally closed relay switch contacts 132ACR1 thereby completing the circuit to the ladder or wire 364 which has therein the relay switch solenoid coil 140CR to be energized thereby. The energization of the solenoid coil 140CR closes relay switch normally open contacts 140CR1 for connecting the ladder of wire 364 with the sub-feed line or wire 266''.

The ram continues in its retracting direction until the dog 230 is reached whereupon the sequence finger 182 is again actuated for closing the limit switch 132LS, Fig. 20, thereby reenergizing relay switches solenoid coils 132ACR, 132BCR and 132CCR. The energization of the solenoid coil 132ACR thereby closed normally open relay switch contacts 132ACR2 for permitting a current flow from the ladder or wire 364 through the sub-lead or wire 266''' to the ladder or wire 365 which has therein the relay switch solenoid coil 141CR for energizing the same. At the same time the current in the ladder or wire 365 energizes the signal R5 which indicates that the saddle motor is about to be rotated or is rotated for upwardly moving the saddle and ram together with the tool carried thereby. The energization of the solenoid coil 141CR closes normally open relay switch contacts 141CR2 for thereby connecting the ladder or wire 365 with the sub-lead or wire 266''.

The energization of the relay switch solenoid coil 141CR at the same time closes the relay switch normally open contacts 141CR2 thereby completing a circuit for effecting the upward movement of the saddle and parts carried thereby. This circuit includes, from the main feed line or wire 266', the wire 329 having therein normally open now closed relay switch contacts 3A3, normally open now closed relay switch contacts 133CR1, normally closed now closed relay switch contacts 143CR1, normally open now closed relay switch contacts 141CR2, relay switch solenoid coil 401CR and relay switch normally closed now closed contacts 131BCR.

The energization of the solenoid coil 401CR closes normally open relay switch contacts 401CR2 and opens normally closed relay switch contacts 401CR1 for accomplishing the same result with respect to the saddle motor that was accomplished above by the closing of relay switch contacts 301CR1 and opening relay switch contacts 301CR2 with respect to the ram motor.

The upward movement of the saddle carries the sequence head finger off of the dog 230 thereby opening limit switch 132LS and closing limit switch 131LS. The opening of the limit switch 132LS again deenergizes relay switch solenoid coils 132ACR, 132BCR and 132CCR thereby allowing normally closed relay switch contacts 132ACR3 to close for effecting a current flow in ladder or wire 366 for energizing relay switch solenoid coil 134CR. The energization of the solenoid coil 134CR opens normally closed relay switch contacts 134CR1 but closes relay switch normally open contacts 134CR2 for thereby connecting the said relay switch solenoid coil 134CR with the sub-lead or wire 266″. It should be noted that the opening of the relay switch normally closed contacts 134CR1 interrupted current flow in the sub-lead or wire 266‴ but current is flowing in sub-lead or wire 266″ since relay switch normally closed contacts 133CCR2 are closed. It should be noted that this current flow is from main feed line or wire 266′ through wires 291 and 314 to the sub-lead or wire 266″ since the connecting wire 314 between the main feed line or wire 266′ and the sub-feed line or wire 266″ was broken by the opening of the normally open relay switch contacts 131ACR2 opened upon deenergization of the said relay switch solenoid coil 131ACR, Fig. 21, deenergized upon the opening of relay switch normally open contacts 101CR2 in turn opened upon the deenergization of the relay switch solenoid coil 101CR in the circuit 338 and 339 from the motor control device 273 and which circuit 338—339 was deenergized when the contour head finger 213 left the contour plate 224 at the end of the fillet forming portion 227 and thereby turned the control of the head and saddle motors over to the sequence head. The circuit is now in condition to stop the rotation of the motors 128 and 78 upon reaching the initial starting point.

It should be noted that the energization of the relay switch solenoid coil 404CR effected the same operation as was effected previously by the energization of the relay switch solenoid coil 304CR, namely, the closing of normally open relay switch contacts 404CR2 and opening of normally closed relay switch contacts 404CR1 for thereby cutting out of the tachometer circuit from the saddle motors tachometer 79 the resistances 409R and 410R so that the said saddle motor may operate at its maximum rapid traverse retracting speed, for example, 3600 R. P. M.

The said saddle and parts carried thereby are retracted until the sequence head finger 182 engages the initial dog 229 for thereby opening limit switch 131LS and closing limit switch 132LS. The opening of the limit switch 131LS deenergized relay switch solenoid coil 404CR for thereby opening relay switch contacts 404CR2 and closing relay switch contacts 404CR1 and reinserting into the tachometer circuit from tachometer 79 the resistances 409R and 410R which feeds the necessary signal and current to the motor control 268 for slowing down the saddle motor.

The closing of the limit switch 132LS reenergizes relay switch solenoid coil 132ACR, 132BCR and 132CCR. The energization of the solenoid coil 132CCR opens normally closed relay switch contacts 132CCR1 for thereby interrupting the current flow in the sub-lead or wire 266″ for thereby deenergizing the circuit in Fig. 20 to the right of relay switches closed contacts 133CR2 and 134CR1 thereby, primarily, deenergizing relay switch solenoid coil 133CCR and opening relay switch contacts 133CCR1 for deenergizing the relay switch solenoid coil 401CR to open relay switch normally open contacts 401CR1 and disconnect current from the line or wire 345 thereby disconnecting current from the saddle motor field circuit 352—353.

Since the master cycle start switch 287 is allowed to open substantially immediately after the initiation of a cycle the circuit in the ladder or wire 292 is broken upon the opening of relay switch normally open contacts 1MS1, opened by the deenergization of the relay switch solenoid coil 1MS upon opening the master cycle switch or button 287, and which ladder or wire 292 is further interrupted by the opening of normally open relay switch contacts 133BCR1, opened by the deenergization of the relay switch solenoid coil 133BCR upon opening of the relay switch normally closed contacts 133CCR2, the saddle motor rotation is stopped with the sequence head finger 182 resting on the surface 233 of the dog 229. The head is therefore in position with its control circuit in condition for effecting a subsequent cycle upon the closing of the cycle master start switch 287.

As was noted above, each of the tool heads has a similar control mechanism and circuit effecting a continuous cyclic operation of its head from a starting point to a return of said starting point.

As was noted above, the tool heads may each be operated through its cycle simultaneously with the operation of the other tool heads through their cycle or the individual heads may be operated through a cycle while the other heads remain quiet. In order to do this it is necessary that the said tool heads have an interlock with the table rotating motor as well as a control or manually operable start button. As shown in Fig. 20 such a manually operable start button or switch is indicated by the reference numeral 367 which has a pair of contacts one of which completes the ladder or wire 292 for effecting a cyclic operation of the head, as above pointed out, while the other pair of contacts, indicated by the reference numeral 367a, simultaneously starts the table motor. This second pair of contacts 367a is shown in Fig. 19 being strapped across lines or wires 300 and 301. It is understood that the switch 367 is held closed until the table motor starts and the tool head cycle initiated which permits the solenoid switch 133BCR to close normally open switch contacts 133BCR1 to form a holding circuit for the cycle.

In setting up the machine it is necessary that there be provided manual controls which are the high and low traverse switches 289 and 290 above referred to. This is accomplished with the contour stylus out of contact with the templet and through a ladder or wire 368 having a connection with a normally unbridged contact of each of the said manually operable low and high traverse switches 289 and 290. A second unbridged contact of low traverse switch 289 is directly connected with the main feed line or wire 266' while a second normally unbridged contact of the high traverse switch 290 is connected through normally bridged contacts of the low traverse switch 289 with the main feed line or wire 266'. A third normally unbridged contact of the low traverse switch 289 is connected by a wire 369 with the ladder or wire 341 while a third normally unbridged contact of the high traverse switch 290 is connected by a wire 371 with the said ladder or wire 341.

The energization of the ladder or wire 341 energizes the relay switch solenoid coil 103CR for effecting the closing of relay switch contacts 103CR1 and 103CR2 for thereby permitting through manual control the same operation that was permitted automatically above upon the energization of said relay switch solenoid coil 103CR. The energization of the ladder or wire 368 energizes relay switches solenoid coils 105CR and 106CR.

The energization of the relay switch solenoid coil 105CR closes normally open relay switch contacts 105CR3 and 105CR4 and simultaneously opens normally closed relay switch contacts 105CR1 and 105CR2 for thereby connecting the wires 342 and 343, respectively, with the wire 328 of the motor control 267 and wire 345 of motor control 268. The current flow in the wire 342 is, at this time, from the motor control 273 through relay switch normally open now closed contacts 103CR1, adjustable resistance or potentiometer 119P, normally open now closed relay switch contacts 105CR3, thyrite resister 175R, and fixed resister 176R to the wire 328. Similarly, the current flow in the wire 343 is from motor control 273 through normally open now closed relay switch contact 103CR2, variable resistance or potentiometer 120P, normally open now closed relay switch contacts 105CR4, thyrite resister 178R and fixed resistance 179R to the wire 345 of the motor control 268.

In operating the machine and because of tool wear or slightly faulty casting it may be desirable to interrupt the cycle of operation or it may be desirable to replace a tool bit which would require the withdrawal of the tool from the cycle momentarily after which the tool is to be returned to the point of withdrawal. In order to accomplish this use is made of manually operable switches 372 and 373 the latter of which is illustrated in Fig. 20 as of two parts separated from one another and which parts have normally bridged contacts and normally unbridged contacts. The switch 372 is likewise shown as having normally bridged contacts and normally unbridged contacts with but a single bridging piece while the switch 373 has two separate bridging pieces. The switch 373 is employed when it is desired to manually take over the movement of the ram inwardly which is done by energizing the relay switch solenoid coil 301CR upon the closing of the unbridged contacts of the switch 373 while the switch 372 is utilized for retracting the ram from the work and is done by energizing the solenoid coil 302CR.

From the foregoing it will be noted that the tool heads may be individually operated through its own cycle as well as operated manually through any portion of a cycle while at the same time each of the heads may be operated simultaneously in performing a complete machine cycle.

What is claimed is:

1. In a machine tool, the combination of a bed, a rotating work support on said bed, a tool head on said bed, said tool head comprising a saddle movable relative to and across the work, a ram on the saddle movable toward and from the work, a tool carried by the ram, a pair of adjustable speed motors respectively connected through transmission trains to the saddle and ram, said motors being operable at high and low speeds to effect rapid traverse movement between the work support and saddle and ram as well as relatively slow stock removal speeds between these members, means for effecting simultaneous and independent rotation of the saddle and ram motors for thereby effecting a cyclic movement of the ram and saddle for rapidly advancing the tool to the work, slowly moving the tool relative to the work and rapidly retracting the tool from the work including control means for independently and simultaneously actuating the saddle and ram motors and a templet cooperating therewith for determining the path and rate of movement of the tool relative to the work.

2. In a machine tool, a tool head adapted to be moved through a cycle of angularly related paths, a pair of electric motors one for effecting said tool head movement in reverse directions in a first given path and the other for effecting said tool head movement in reverse directions in a second given path angularly related to the first given path, said motors together actuating said tool head in reverse directions through a path angularly related to the first and second given paths, electronic means for individually and simultaneously effecting the rate and direction of rotation of said motors, and control means carried by the tool head for controlling said electronic means and sequentially actuating said motors individually and simultaneously to cause the tool head to pass through its cycle of angularly related paths.

3. In a machine tool, a tool head adapted to be moved through a cycle of angularly related paths, a pair of electric motors one for effecting said tool head movement in reverse directions in a first given path and the other for effecting said tool head movement in reverse directions in a second given path angularly related to the first given path, said motors together actuating said tool head in reverse directions through a path angularly related to the first and second given paths, electronic means for individually and simultaneously effecting the rate and direction of rotation of said motors, control means carried by the tool head for controlling said electronic means and sequentially actuating said motors individually and simultaneously to cause the tool head to pass through its cycle of angularly related paths, the tool head moving at a rapid rate through certain portions of its cycle and at slow rate through other portions of its cycle, and additional control means for the electronic means for determining the slow rate of movement.

4. In a machine tool, a tool head adapted to be moved through a cycle of angularly related paths, a pair of electric motors one for effecting said tool head movement in reverse directions in a first given path and the other for effecting said tool head movement in reverse directions in a second given path angularly related to the first given path, said motors together actuating said tool head in reverse directions through a path angularly related to the first and second given paths, electronic means for individually and simultaneously effecting the rate and direction of rotation of said motors, control means carried by the tool head for controlling said electronic means and sequentially actuating said motors individually and simultaneously to cause the tool head to pass through its cycle of angularly related paths, the tool head moving at a rapid rate through certain portions of its cycle and at slow rate through other portions of its cycle, additional control means for the electronic means for determining the slow rate of movement, and means operated by said control means and additional control means for changing the slow rate of movement of the tool head while in the slow rate movement portion of its cycle.

5. In a machine tool, the combination comprising a work support, a pair of tool heads movable independently into operative relation with said work support, power means for moving said tool heads, a pair of contouring control means in controlling relation to said power means for moving said tool heads to effect successive coordinated contouring operations on a surface of work on said work support, each of said control means including a contour determining templet element and a tracer element for following said templet element, each of said control means including a slide support for carrying one of said elements, the other of said elements being mounted on the corresponding one of said tool heads, and means for simultaneously adjusting said slide supports to change the overall finished dimensions of the work while maintaining the coordinated relation between said contouring operations.

References Cited in the file of this patent
UNITED STATES PATENTS

| Number | Name | Date |
|---|---|---|
| 429,162 | Taylor | June 3, 1890 |
| 446,792 | Schwanhausser | Feb. 17, 1891 |
| 946,399 | Rhoads | Jan. 11, 1910 |
| 1,316,372 | Liebreich | Sept. 16, 1919 |
| 1,350,924 | Eaton | Aug. 24, 1920 |
| 1,549,451 | Cole et al. | Aug. 11, 1925 |
| 1,790,681 | Smith | Feb. 3, 1931 |
| 1,799,384 | Millspaugh | Apr. 7, 1931 |
| 1,857,457 | Kimmel | May 10, 1932 |
| 1,878,628 | Foster | Sept. 20, 1932 |
| 1,999,787 | Sassen | Apr. 30, 1935 |
| 2,002,186 | Lovely | May 21, 1935 |
| 2,106,581 | Unwin | Jan. 25, 1938 |
| 2,118,020 | Curtis | May 17, 1938 |
| 2,118,021 | Curtis | May 17, 1938 |
| 2,232,304 | Baker | Feb. 18, 1941 |
| 2,342,792 | Dare et al. | Feb. 29, 1944 |
| 2,388,555 | Kuehni et al. | Nov. 6, 1945 |
| 2,397,108 | Hanna | Mar. 26, 1946 |
| 2,457,553 | Hornfeck | Dec. 28, 1948 |
| 2,557,824 | Hornfeck | June 19, 1951 |